(12) United States Patent
Kravets

(10) Patent No.: US 9,344,907 B1
(45) Date of Patent: May 17, 2016

(54) ANALYZING WIRELESS SIGNAL PROPAGATION

(71) Applicant: Cognitive Systems Corp., Waterloo (CA)

(72) Inventor: Oleksiy Kravets, Petersburg (CA)

(73) Assignee: Cognitive Systems Corp., Waterloo, Ontario (CA)

( * ) Notice: Subject to any disclaimer, the term of this patent is extended or adjusted under 35 U.S.C. 154(b) by 0 days.

(21) Appl. No.: 14/730,688

(22) Filed: Jun. 4, 2015

(51) Int. Cl.
*H04B 17/391* (2015.01)
*H04W 24/06* (2009.01)
*H04W 84/18* (2009.01)

(52) U.S. Cl.
CPC ........... *H04W 24/06* (2013.01); *H04B 17/3912* (2015.01); *H04W 84/18* (2013.01)

(58) Field of Classification Search
CPC ..... H04W 16/22; H04W 24/06; H04W 84/18; H04W 16/18; H04W 24/00; H04W 24/02; H04W 24/04; H04B 17/3912
USPC ................................ 455/456.1, 456.5, 456.6
See application file for complete search history.

(56) References Cited

U.S. PATENT DOCUMENTS

| | | | |
|---|---|---|---|
| 6,046,682 A | 4/2000 | Zimmerman et al. | |
| 6,564,065 B1 | 5/2003 | Chang et al. | |
| 6,580,914 B1 | 6/2003 | Smith | |
| 6,816,709 B2 | 11/2004 | Dickey | |
| 6,917,609 B2 | 7/2005 | Dickey | |
| 6,931,235 B2 | 8/2005 | Kline et al. | |
| 6,950,665 B2 | 9/2005 | Swift et al. | |
| 7,013,113 B2 | 3/2006 | Dickey | |
| 7,019,691 B1 | 3/2006 | Soltanian et al. | |
| 7,050,755 B2 | 5/2006 | Kline | |

(Continued)

FOREIGN PATENT DOCUMENTS

| CA | 2192248 | 6/1997 |
|---|---|---|
| EP | 0863638 A2 | 9/1998 |

(Continued)

OTHER PUBLICATIONS

Yuvraj Singh, "Comparison of Okumura, Hata and COST-231 Models on the Basis of Path Loss and Signal Strength", International Journal of Computer Applications (0975-8887), vol. 59, No. 11, Dec. 2012, 5 pages.

(Continued)

*Primary Examiner* — Dinh P Nguyen
(74) *Attorney, Agent, or Firm* — Michael K. Henry; Henry Patent Law Firm PLLC

(57) ABSTRACT

In some aspects, a wireless-spectrum analysis technique includes obtaining, at a computer system, a simulated spatial distribution of a wireless signal parameter (e.g., spectral power). The simulated spatial distribution is based on a computer-simulation of wireless signal propagation in a geographic region. A measured spatial distribution of the wireless signal parameter is obtained at the computer system. The measured spatial distribution is based on measurements performed by wireless sensor devices in the geographic region. Each of the wireless sensor devices is configured to provide local parameter measurements based on wireless signals detected by the wireless sensor device. The simulated spatial distribution is compared with the measured spatial distribution. In some instances, the simulated spatial distribution geographic region is modified based on the comparison.

20 Claims, 12 Drawing Sheets

(56) References Cited

U.S. PATENT DOCUMENTS

| | | | |
|---|---|---|---|
| 7,236,746 | B2 | 6/2007 | Peric |
| 7,272,126 | B2 | 9/2007 | Soltanian et al. |
| 7,295,156 | B2 | 11/2007 | Van Wyck Loomis |
| 7,460,837 | B2 | 12/2008 | Diener |
| 7,466,986 | B2 | 12/2008 | Halcrow et al. |
| 7,610,036 | B2 | 10/2009 | Teo et al. |
| 7,639,985 | B2 | 12/2009 | Dickey |
| 8,422,461 | B2 | 4/2013 | Dickey |
| 8,576,825 | B2 | 11/2013 | Wu et al. |
| 2003/0139909 | A1 | 7/2003 | Ozawa |
| 2004/0152471 | A1 | 8/2004 | MacDonald |
| 2005/0108129 | A1 | 5/2005 | Seibert et al. |
| 2005/0286409 | A1 | 12/2005 | Yoon et al. |
| 2006/0083205 | A1 | 4/2006 | Buddhikot et al. |
| 2006/0246911 | A1 | 11/2006 | Petermann |
| 2008/0076450 | A1 | 3/2008 | Nanda et al. |
| 2008/0125108 | A1 | 5/2008 | Kuo et al. |
| 2008/0166974 | A1 | 7/2008 | Teo et al. |
| 2008/0231499 | A1 | 9/2008 | Kim et al. |
| 2008/0266050 | A1* | 10/2008 | Crouse et al. ............... 340/3.1 |
| 2009/0197550 | A1 | 8/2009 | Huttunen et al. |
| 2009/0201208 | A1 | 8/2009 | McPherson et al. |
| 2010/0124886 | A1 | 5/2010 | Fordham et al. |
| 2010/0135263 | A1 | 6/2010 | Zakrzewski |
| 2010/0203837 | A1 | 8/2010 | Taniguichi |
| 2010/0246416 | A1 | 9/2010 | Sinha et al. |
| 2011/0085524 | A1 | 4/2011 | Soliman et al. |
| 2011/0166897 | A1 | 7/2011 | Beckman |
| 2011/0185059 | A1 | 7/2011 | Adnani et al. |
| 2011/0210843 | A1 | 9/2011 | Kummetz |
| 2011/0285589 | A1 | 11/2011 | Bull |
| 2012/0238218 | A1 | 9/2012 | Stine |
| 2013/0029589 | A1 | 1/2013 | Bontu et al. |
| 2013/0072226 | A1 | 3/2013 | Thramann |
| 2013/0150074 | A1 | 6/2013 | Shrestha et al. |
| 2013/0310093 | A1* | 11/2013 | Giannakis et al. ............ 455/501 |
| 2014/0063055 | A1 | 3/2014 | Osterhout et al. |
| 2014/0086081 | A1 | 3/2014 | Mack et al. |
| 2014/0162702 | A1 | 6/2014 | Crawford et al. |
| 2014/0168225 | A1 | 6/2014 | Ohwaki et al. |
| 2014/0274109 | A1 | 9/2014 | Venkatraman et al. |
| 2014/0362711 | A1 | 12/2014 | Jiang et al. |
| 2015/0119014 | A1* | 4/2015 | Muraoka et al. ............. 455/418 |

FOREIGN PATENT DOCUMENTS

| | | |
|---|---|---|
| WO | 03/009612 | 1/2003 |
| WO | 2006/135542 | 12/2006 |
| WO | 2010/083606 | 7/2010 |

OTHER PUBLICATIONS

SeeGull® EXflex™ Scanning Receiver, PCTEL® RF Solutions, Obtained online at http://rfsolutions.pctel.com/artifacts/10MRK2_11_SeeGull_EXflex_Brochure.pdf on Jul. 17, 2014, 4 pages.

EXflex™ Pay Per Use Metered Licensing System, Feature Highlight, Obtained online at http://rfsolutions.pctel.com/artifacts/Pctel_PPU_FINAL.PDF on Jul. 17, 2014, 1 page.

PCTEL, SeeGull® Scann Receivers, High Performance Wireless Network Measurement, Obtained online at http://rfsolutions.pctel.com/content.cgi?id_num=683 on Jul. 17, 2014, 8 pages.

Baldock radio monitoring station, obtained online at http://stakeholders.ofcom.org.uk/binaries/enforcement/spectrum-enforcement/baldock.pdf, on Jul. 17, 2014, 13 pages.

PCTEL, SeeHawk® Wireless Drive and Walk Test Suite, obtained online at http://rfsolutions.pctel.com/content.cgi?id_num=1013 on Aug. 20, 2014, 9 pages.

AZQ Android—WCDMA/GSM Drive Test Tool on Android, obtained online at http://www.azenqos.com/ on Aug. 6, 2014, 13 pages.

Buddhikot et al. DIMSUMNet: New Directions in Wireless Networking Using Coordinated Dynamic Spectrum Access, Poroceedings of the Sixth IEEE International Symposium on (WoWMoM '05), 2005 IEEE; 8 pages.

Office Action in U.S. Appl. No. 14/334,822 issued on Oct. 24, 2014, 17 pages.

Office action in U.S. Appl. No. 14/521,173 on Dec. 10, 2014, 15 pages.

International Search Report and Written Opinion issued in application PCT/CA2014/000602 on Mar. 20, 2015, 10 pages.

Office action in U.S. Appl. No. 14/613,912 issued on May 19, 2015, 18 pages.

Hata model for urban areas, Wikipedia, http://en.wikipedia.org/wiki/Hata_model_for_urban_areas, dated Feb. 25, 2015, 2 pages.

Okumura model, Wikipedia, http://en.wikipedia.org/wiki/Okumura_model, dated Apr. 16, 2015, 2 pages.

Ray tracing, Wikipedia, http://en.wikipedia.org/wiki/Ray_tracing_(physics), dated Sep. 5, 2014, 3 pages.

Andreas F. Molisch, "Appendix 7.A: The Okumura-Hata Model," *Wireless Communications, Second Edition*, 2011, John Wiley & Sons, Ltd., 26 pages.

H. K. Sharma et al., "Enhanced Cost231 W.I. Propagation Model in Wireless Networks," International Journal of Computer Applications, vol. 19, No. 6, 2011, 7 pages.

Glassner et al., Chapters 1 and 2, *An Introduction to Ray Tracing*, Academic Press Limited, 1997, 42 pages.

Canadian International Searching Authority; International Search Report and Written Opinion of the International Searching Authority issued in International Application No. PCT/CA2014/000826 on Jul. 16, 2015; 8 pages.

United States Patent and Trademark Office; Non-Final Office Action received in U.S. Appl. No. 14/668,549, Jun. 10, 2015, 11 pages.

Non-Final Office Action received in U.S. Appl. No. 14/668,549, Jan. 4, 2016, 24 pages.

International Search Report and Written Opinion of the International Searching Authority issued in International Application No. PCT/CA2015/000197 on Nov. 5, 2015; 11 pages.

International Search Report and Written Opinion of the International Searching Authority issued in International Application No. PCT/CA2015/000349 on Nov. 30, 20155; 9 pages.

Canadian Patent Office; International Search Report and Written Opinion of the International Searching Authority issued in International Application No. PCT/CA2015/000446 on Feb. 24, 2016; 10 pages.

Bengtsson, M., et al., On the Estimation of Azimuth Distributions and Azimuth Spectra, Vehicular Technology conference, 2001, VTC 2001, IEEE VTS 54th, Atlantic City, NJ, Oct. 7, 2001, vol. 3, pp. 1612-15.

Tang, et al., Study on Power Azimuth Spectrum of Wireless Channel in Microcell Environments, 14th IEEE 2003 International Symposium on Personal, Indoor and Mobile Radio Proceedings, Sep. 7, 2003, vol. 1, pp. 685-87.

* cited by examiner

ANALYZING WIRELESS SIGNAL PROPAGATION

BACKGROUND

This specification relates to analyzing propagation of wireless signals, for example, radio frequency signals.

Radio frequency (RF) spectrum is a limited and valuable resource. Governmental agencies and regulatory authorities typically control allocation and use of the spectrum, and the rights to use portions of the spectrum are sold or licensed to wireless service providers and other types of public and private entities. The wireless service providers use the spectrum allocated to them to provide wireless services to end users, for example, in the frequency bands for wireless communication standards.

SUMMARY

In a general aspect, wireless signal measurements are used in connection with simulating wireless signal propagation.

In some aspects, a wireless-spectrum analysis technique includes obtaining, at a computer system, a simulated spatial distribution of spectral power for a geographic region. The simulated spatial distribution is based on a computer-implemented simulation of wireless signal propagation in the geographic region. A measured spatial distribution of spectral power for the geographic region is obtained at the computer system. The measured spatial distribution is based on spectral power measurements performed by wireless sensor devices in the geographic region. Each of the wireless sensor devices is configured to provide local spectral power measurements based on wireless signals detected by the wireless sensor device. The simulated spatial distribution is compared with the measured spatial distribution. In some instances, the simulated spatial distribution of spectral power for the geographic region is modified based on the comparison.

The details of one or more implementations are set forth in the accompanying drawings and the description below. Other features, objects, and advantages will be apparent from the description and drawings, and from the claims.

DESCRIPTION OF DRAWINGS

FIG. 5A shows simulated and measured spatial distributions of a wireless signal parameter; FIG. 5B shows an interpolated difference curve based on FIG. 5A; and FIG. 5C shows a modified distribution of the wireless signal parameter.

Like reference symbols in the various drawings indicate like elements.

DETAILED DESCRIPTION

Figure 1:
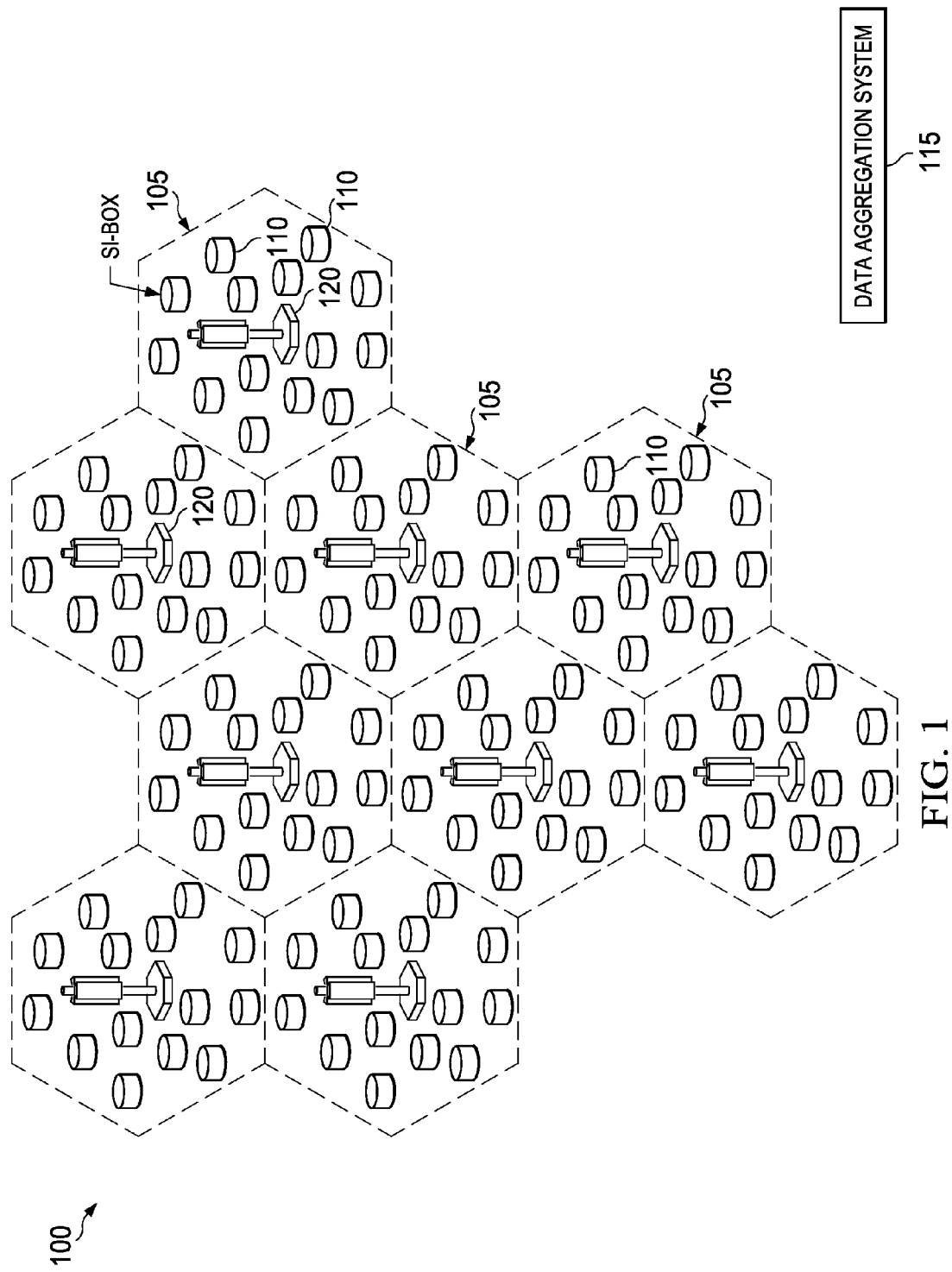
FIG. 1 is a block diagram showing an example wireless-spectrum analysis system.

In some aspects of what is described here, a distributed network of wireless sensor devices are used in combination with a propagation model to analyze wireless signal propagation. For example, a radio propagation model can be used to simulate wireless signal propagation in a geographic region, and wireless signal measurements obtained by wireless sensor devices distributed in the geographic region can be used to adjust the output of the radio propagation model. In some implementations, the measurements from the wireless sensor devices are used to validate, invalidate, correct, improve or otherwise analyze data from a radio propagation model.

In some implementations, the radio propagation model is used to improve the measurement resolution provided by the network of wireless sensor devices. For instance, the wireless sensor network may provide a measured spatial distribution having a spatial resolution that is determined by the locations or location-density of the wireless sensors in the geographic region. In certain environments (e.g., urban environments or other types of environments), radio frequency fading and multi-path effects may have a significant impact on certain length scales (e.g., length scales under 10 meters), and wireless sensor devices can be deployed within a few meters of each other in order to provide a complete and accurate view of the spectral-usage in such environments. In some cases, deploying wireless sensor devices within a few meters of each other is impractical or expensive. In these and other scenarios, wireless sensor devices can be deployed less densely (with more spacing between them), and numerical simulations can be combined with the measured data to provide a higher resolution. Such techniques may be used, for example, to obtain estimated signal measurements for locations and regions where a wireless sensor device is not located (e.g. at locations between the wireless sensor devices within the geographic region).

In some examples, the techniques and systems described here are used to analyze wireless signal propagation for a wireless communication network, such as, for example, a cellular network, a Wi-Fi network, a Bluetooth network, or another type of wireless communication network. For instance, since the locations and characteristics of base-stations or wireless access points can be modeled with some degree of accuracy, a computer system can simulate wireless signal propagation produced by operation of the base-stations or wireless access points or other elements in a wireless communication network.

In some instances, a computer system can collect measurements and measurement-location data from the network of wireless sensor devices, since the location of each wireless sensor device typically is known or can be detected. The computer system can obtain the RF spectrum measurement, for example, in the form of a grid with fixed or mobile grid points. The computer system can also obtain a simulated RF spectrum, for example, based on a radio propagation model. Differences between the RF spectrum measurement and the simulated RF spectrum may occur, for example, due to signal fading, multi-path effects, variations in the environment, moving objects, dynamic sources of RF signals, modeling errors or limitations, or other reasons.

In some of implementations, the RF spectrum measurements from the wireless sensor devices may be considered the "correct" information, and the "correct" information can be compared with (e.g. subtracted from) the simulated RF spectrum to calculate modeling errors across an area of interest. Errors at locations between the wireless sensor devices may be identified by interpolation techniques, for example, using available two- or three-dimensional interpolation methods to form an error mesh. The error mesh can be updated dynamically as the computing system receives new data from the wireless sensor devices. The error mesh can be applied to the static RF spectrum model in the form of a two- or three-dimensional correction. The dynamically-corrected view of the RF spectrum model can be presented, for example, to a user in a graphical user interface with a range of desired resolutions.

In some implementations, a wireless-signal analysis system includes a sensor network formed by a group of wireless sensor devices. In some implementations, the sensor devices detect signals transmitted according to a wireless communication network protocol. For example, the sensor devices may detect signals exchanged in a cellular network, although the sensor devices themselves are not part of the cellular network. The signals detected by the sensor devices can include signals that are formatted (e.g., by a mobile device or another type of user equipment) for wireless communication with a cellular base station, a Wi-Fi access point, or another wireless resource provider. The signals can be compared with, or otherwise analyzed in combination with a computer-implemented simulation of the wireless communication network.

In some aspects of what is described here, wireless signals are monitored and analyzed over space and time. For example, parameters of the wireless signals can be aggregated from a number of wireless sensor devices that operate concurrently at various locations in a geographic region. The geographic region can be relatively small or large (e.g., having a radius ranging from tens or hundreds of meters to multiple kilometers) and can generally represent any area of interest (e.g., a building, city block, jurisdiction, demographic, industry, etc.). In some instances, the aggregated measurement data can be combined with simulated data, for example, to facilitate a realistic and comprehensive analysis of spectral usage and provide an understanding of the utilization and quality of wireless-spectrum and other resources in the geographic region.

In some implementations, wireless signals formatted according to various wireless communication standards are simulated, monitored and analyzed. For example, the computing system can simulate and analyze, and the wireless sensor devices can monitor and analyze, 2G standards such as Global System for Mobile (GSM) and Enhanced Data rates for GSM Evolution (EDGE) or EGPRS; 3G standards such as Code division multiple access (CDMA), Universal Mobile Telecommunications System (UMTS), and Time Division Synchronous Code Division Multiple Access (TD-SCDMA); 4G standards such as Long-Term Evolution (LTE) and LTE-Advanced (LTE-A); wireless local area network (WLAN) or WiFi standards such as IEEE 802.11, Bluetooth, near-field communications (NFC), millimeter communications; or multiple of these or other types of wireless communication standards. In some implementations, other types of wireless communication (e.g., non-standardized signals and communication protocols) are monitored and analyzed.

With more accurate and more comprehensive spectrum usage data, targeted schemes can be designed to improve the utilization of wireless-spectrum and other resources. In some instances, based on utilization and quality of the frequency bands that they own or operate on, spectrum rights owners and licensees or wireless service providers can design, modify, or otherwise manage their own spectrum usage. For example, given the knowledge that certain geographic locations experience heavy data traffic, wireless service providers may add base stations or modify a cell configuration (e.g., adjusting a frequency reuse scheme) to accommodate the heavy data traffic in the geographic locations. As another example, given the knowledge that certain times of day experience heavier data traffic than others, wireless service providers may design promotions or policies to encourage usage during other than peak hours.

In some examples, a wireless-spectrum analysis system includes a number of wireless sensor devices, a data aggregation system. The wireless sensor devices can be distributed over various locations over a geographic region. The wireless sensor devices can monitor and analyze the RF spectrum at the respective locations and transmit information to the data aggregation system. The data aggregation system can serve as a central back-end system that aggregates, compiles, and analyzes information transmitted from the wireless sensor devices. The data aggregation system may perform simulations of the wireless spectrum, or the data aggregation system may obtain simulation data from an external simulation system.

In some implementations, the wireless-spectrum analysis system and the individual wireless sensor device can perform various types of analysis in the frequency domain, the time domain, or both. For example, the wireless sensor devices may analyze the wireless spectrum in a frequency domain, in the time domain, or both. In some cases, the wireless sensor devices are configured to determine bandwidth, power spectral density, or other frequency attributes based on detected signals. In some cases, the wireless sensor devices are configured to perform demodulation and other operations to extract content from the wireless signals in the time domain such as, for example, signaling information included the wireless signals (e.g., preambles, synchronization information, channel condition indicator, SSID/MAC address of a WiFi network).

In some examples, a wireless-spectrum analysis system provides a spectral-usage report based on spectral-usage data from the devices. The spectral-usage report can be provided to users (e.g., in a user interface), stored in a database (e.g., for analysis or archival purposes), transmitted to subscribers or other entities (e.g., governmental agencies or regulatory authorities, standards-development organizations, spectrum rights owners and licensees, wireless service providers, etc.), or output in another manner. In some instances, a spectral-usage report can include text, data, tables, charts, graphs or other representations of wireless-spectrum usage.

In some examples, the spectral-usage report can include frequency-domain information, time-domain information, spatial-domain information, or a combination of these and other knowledge gained from analyzing the wireless signals detected by the wireless sensor devices. The spectral-usage report can include global information and higher-level knowledge based on the data from all multiple wireless sensor devices in disparate locations. For instance, the spectral-usage report can include trends, statistics, patterns, coverage, network performance, or other information over time or space. In some implementations, the spectral-usage report can be tailored or customized based on the business, preferences, or other attributes of a particular user or entity.

In some examples, a large number of wireless sensor devices can be used at distinct locations over a geographic region to concurrently monitor wireless signals at each distinct location. Accordingly, RF signals at various locations can be inspected at the same time or during overlapping time periods, which may render a more accurate and more comprehensive inspection of wireless signals over the geographic region. In some cases, wireless sensor devices monitor wireless signals at their respective locations passively, for example, by "listening" or "watching" for RF signals over a broad range of frequencies and processing the RF signals that they detect. There may be times when no RF signals are detected, and a wireless sensor device may process RF signals (e.g., from time to time or continuously) as they are detected in the local environment of the device.

In many instances, the wireless sensor devices can detect wireless signals that have been transmitted by or between other entities or systems, for example, on a particular frequency or set of frequencies, or by natural phenomena; and the propagation model or propagation simulation software can also be configured to simulate such wireless signals. Accordingly, the propagation model may simulate and the wireless sensor devices may monitor wireless-spectrum usage by a variety of systems, entities, or phenomena, and the systems described here are not limited to any particular type or class of systems or protocols.

In some cases, the wireless sensor devices can be implemented as relatively low-cost, compact, and lightweight devices. The small size and portability can, in some instances, expand the applicability and enhance the flexibility of the wireless-spectrum analysis system. In some instances, wireless sensor devices can be placed at or coupled to a pico/femto cell box of a cellular system, a WiFi access point or base station, a vehicle, a router, a mobile device (e.g., a smartphone, a tablet, etc.), a computer, an Internet of Things (e.g., machine to machine (M2M)) module, a cable modem box, a home gear electronic box (e.g., TV, modem, DVD, video game stations, laptops, kitchen gear, printers, lighting, phones, clocks, thermostats, fire detection units, $CO_2$ detection units, etc.) or other places.

In some implementations, a wireless sensor device can perform computations and analyses on the raw data (e.g., the detected RF signals) on the spot, to extract a digest of relevant information (e.g., spectral-usage parameters). In some implementations, instead of transmitting the raw data to the data aggregation system, the wireless sensor devices transmit the digest extracted from the raw data, which may reduce data traffic, reduce power consumption (which may extend battery life, where applicable), and provide other advantages. In some cases, the raw data can be transmitted to the data aggregation system, for example, upon request or in other instances.

In some implementations, communication between wireless sensor devices and a data aggregation system can be based on, for example, internet protocol (IP) transport or another standard data transport protocol, which may provide more efficient data transmission. In general, messages can be transmitted from the wireless sensor devices to the data aggregation system at any time. For example, the transmission can be triggered by detected usage of the RF spectrum, initiated by a request from the data aggregation system, sent according to a predetermined schedule or periodic intervals, or otherwise. In some instances, the aggregation system can request data from a particular wireless sensor device.

In some examples, the wireless sensor devices can be deployed and controlled from a back-end system. For example, the wireless sensor devices may operate without requiring a technician on site to operate the device. In some implementations, a data aggregation system or another type of central control system can execute control operations, for example, to configure or upgrade the wireless sensor devices. In some instances, the control system can request configuration information or run internal tests on any particular wireless sensor device.

FIG. 1 is a block diagram showing an example wireless-spectrum analysis system 100 that can identify the location of a wireless source. The example wireless-spectrum analysis system 100 shown in FIG. 1 includes a network of wireless sensor devices 110 and a data aggregation system 115. As shown in FIG. 1, a number (e.g., tens, hundreds, or thousands) of wireless sensor devices 110 can be distributed over a geographic area encompassing multiple cells 105 of one or more cellular networks, with multiple wireless sensor devices 110 in each cell 105. In some implementations, the wireless sensor devices 110 can be distributed over another geographic region, for example, an area that does not include a cellular network. The wireless sensor devices 110 can be identical or similar to each other, or the wireless-spectrum analysis system 100 can include a variety of different wireless sensor devices 110.

As shown in FIG. 1, each cell 105 includes one or more base stations 120, which interface with user equipment (e.g., cellular phones, etc.) in a cellular network (e.g., a cellular voice network, cellular data network, etc.). Each cell 105 typically includes a single base station 120. Typically, the density of the base stations in a geographic region is determined based on a desired cell coverage and is computed during a cell planning stage and thus remains relatively fixed once the infrastructure has been deployed.

A base station 120 typically provides wireless service for mobile devices in a broad region, for example, over an entire cell 105. As such, the base stations 120 need enough power to transmit signals over a relatively large region, for example, to provide satisfactory cell coverage. Base stations typically use an array of high-power processors or high-power components with power consumption on the order of 10 Watts to 100 Watts or more, and may require cooling systems to maintain an operating temperature of the base station. For these and other reasons, base stations are often large, expensive systems. For example, a cellular base station is often composed of several antennas mounted on a tower and a building with electronics near the base of the tower, and a cellular base station can cost in the range of $100,000 to $1,000,000 or more, in some instances.

In the example shown, the wireless sensor devices 110 provide data to the data aggregation system 115. For example, the wireless sensor devices 110 may send messages (e.g., IP packets, Ethernet frames, etc.) to the data aggregation system 115 through an IP network, an Ethernet, or another communication system. For instance, the wireless-spectrum analysis system 100 may leverage existing communication and power infrastructure (e.g., public networks, private networks, wide area networks, etc.), other than (or including) the cellular networks supported by the base stations 120.

The example wireless sensor devices 110 can be modular or standalone devices that that each monitor and analyze wireless signals in a local area. In some cases, the wireless sensor devices 110 are passively interact with the cellular network, for example, without providing cellular service (e.g., to user equipment), without using the cellular network's radio resources, without supporting operation of the base stations 120, or without otherwise operating as a component of the cellular network. The wireless sensor devices 110 can include specialized hardware (e.g., customized circuits, customized chipsets, etc.) and specialized software (e.g., signal processing and analysis algorithms) for detecting and analyzing wireless signals.

In some instances, the wireless sensor devices 110 operate with low power consumption (e.g., around 0.1 to 0.2 Watts or less on average), and they can be relatively small and inexpensive. In some examples, an individual wireless sensor device can be smaller than a typical personal computer or laptop computer and can operate in a variety of environments. In some cases, the wireless sensor devices are modular, portable, compact devices that can be installed in office spaces, on urban infrastructure, in residential areas, on vehicles, or other locations. In some cases, a wireless sensor device can be manufactured for less than $100, although the actual cost will vary.

In the example shown in FIG. 1, the wireless sensor devices 110 are geographically distributed more densely than the base stations 120. As such, in some instances, the wireless sensor devices 110 can inspect the wireless-spectrum with higher location resolution and accuracy. As a particular example, hundreds or thousands of wireless sensor devices 110 may be placed in various locations within a city, with approximately fifty wireless sensor devices 110 within each area of each cell 105, although the actual number will vary for individual applications. Each wireless sensor device 110 resides in a distinct location (i.e., a location that is physically distinguishable from the locations of the other wireless sensor devices 110).

The density of the wireless sensor devices 110 in a geographic area can be determined, for example, based on the area, population, location, or other factors of the geographic area. For instance, the density of the wireless sensor devices 110 in an urban area may be higher than in a rural area in some instances. In some cases, due to their relatively low cost and small size, the example wireless sensor devices 110 can be distributed throughout a cell 105 or another region of interest to provide a more economical solution for monitoring and analyzing wireless-spectrum usage throughout the region.

The wireless-spectrum analysis system 100 can be implemented, in some cases, with a high level of flexibility in system configuration and management. For example, the wireless sensor devices 110 can be portable, plug-and-play devices that can be relocated relatively easily, and can operate in a variety of locations. In some examples, the wireless sensor devices 110 have standard communication interfaces (e.g., Ethernet, WiFi, USB, etc.) and accept standard power or operate on battery power. Accordingly, the configuration of the wireless-spectrum analysis system 100 (e.g., the total number, density, and relative locations of the wireless sensor devices 110) can accommodate a variety of environments and can be modified or adjusted, for example, from time to time.

The example data aggregation system 115 can receive data (including measurements, a digest of relevant information, etc.) sent from the wireless sensor devices 110, store the data (e.g., in a database), and execute algorithms that process the aggregated data from the database to extract higher-level information. The higher-level information can include, for example, wireless-signal source locations, trends, statistics, coverage, network usage, or any other local or global information associated with the wireless sensor devices 110. The data aggregation system 115 may also control operation of the wireless sensor devices 110 and interact with them individually, for example, to provide synchronization data, to request particular data, or to perform other control operations.

In some implementations, the data aggregation system 115 obtains a simulated distribution for a parameter of the wireless network or a parameter of the wireless spectrum in the geographic region covered by one or more of the base stations 120. For example, the data aggregation system 115 may obtain a simulated spatial distribution of spectral power for all or part of the geographic region. The simulated distribution can be generated by a computer-implemented simulation, for example, based on a radio propagation model. In addition, the data aggregation system 115 can obtain a measured distribution for the same parameter of the wireless network or the same parameter of the wireless spectrum in the geographic region. The measured distribution can be based on parameters provided by the wireless sensor devices 110. The wireless sensor devices 110 are an example means for generating local spectral power measurements for distinct locations over a geographic region based on wireless signals detected at the distinct locations. For example, the data aggregation system 115 may obtain a measured spatial distribution of spectral power based on local spectral power measurements provided by the individual wireless sensor devices 110. The data aggregation system 115 can compare the simulated distribution with the measured distribution, and in some cases, can use the measured distribution to correct or otherwise modify the simulated distribution. In such cases, the modified simulated distribution can provide a higher-resolution indication of the parameter of the wireless network or the parameter of the wireless spectrum in the geographic region. In some cases, the modified simulated distribution is dynamically updated based on updated measurements from the wireless sensor devices 110.

Figure 2:
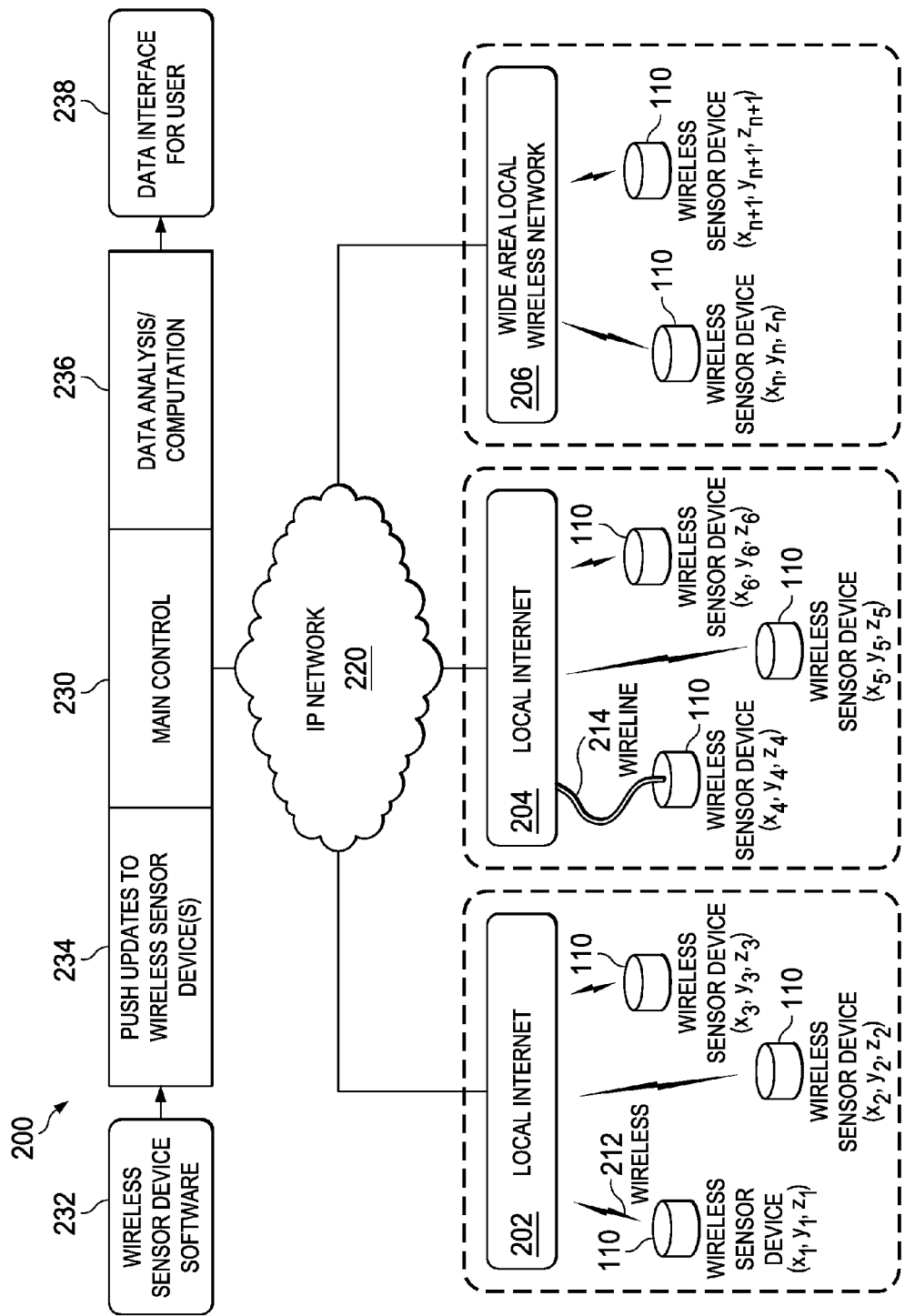
FIG. 2 is a block diagram showing architecture of an example wireless-spectrum analysis system.

FIG. 2 is a block diagram showing architecture of an example wireless-spectrum analysis system 200 that can be used to locate RF sources. The wireless-spectrum analysis system 200 can represent the wireless-spectrum analysis system 100 of FIG. 1, or another wireless-spectrum analysis system. The example wireless-spectrum analysis system 200 includes a number of wireless sensor devices 110, an IP network 220, and a main controller 230. The wireless-spectrum analysis system 200 can include additional or different components. In some implementations, a wireless-spectrum analysis system can be arranged as shown in FIG. 2 or in another suitable manner.

In the example shown in FIG. 2, each wireless sensor device 110 is implemented as a wireless sensor device at a respective physical location having spatial coordinates ($x_i$, $y_i$, $z_i$), where i varies from 1 to L (L is the number of the wireless sensor devices 110). In some implementations, each wireless sensor device can include a Global Positioning System (GPS) or another location identification system that identifies the location coordinates of the wireless sensor device, or the location coordinates can be identified in another manner. In some implementations, each wireless sensor device has a unique identifier, and the identifier can be associated with a location identifier or location coordinates.

The example wireless sensor devices can monitor and analyze wireless-spectrum in both frequency and time domains and perform in-depth analyses of wireless communication services available at the associated geographic location. For instance, the wireless sensor device can detect an RF signal in a local wireless environment about the location of the wireless sensor device at any given time. In some instances, the wireless sensor device can identify data packets and frames, extract synchronization information, cells and services identifiers, and quality measurements of RF channels (e.g., channel quality indicator (CQI)), and derive spectral-usage parameters and other information based on these and other control information and traffic data of the RF signal detected by the wireless sensor device. The control information and traffic data of the RF signal can include physical and medium access (MAC) layers information corresponding to a wireless communication standard such as 2G GSM/EDGE, 3G/CDMA/UMTS/TD-SCDMA, 4G/LTE/LTE-A, WiFi, Bluetooth, etc. The spectral-usage parameters (e.g., for particular frequencies or particular bandwidths, etc.) can include the power of detected RF signals, the signal-to-noise ratio (SNR) of detected RF signals, arrival-time data, the frequency at which detected RF signals have maximum power, or other parameters. In some implementations, the wireless sensor device can identify RF jammers and interferers, or other types of information.

In the example shown in FIG. 2, data from the wireless sensor devices (e.g., arrival-time data, or other information) are aggregated by a data aggregation or central control system (e.g., the main controller 230). In some implementations, data from the wireless sensor devices are aggregated by the main controller 230 by receiving the messages transmitted from the wireless sensor devices, for example, through the IP network (e.g., the IP network 220). In some implementations, the wireless sensor devices are connected to the IP network 220 via a local network (e.g., a local internet 202 or 204). The wireless sensor devices can be connected to the local network by a local wireline network 214 or a wireless network 212. The wireline network 214 can include, for example, Ethernet, xDSL (x-digital subscriber line), optical network, or other types of wireline communication networks. The wireless network 212 can include, for example, WiFi, Bluetooth, NFC, or other types of local wireless networks. In some implementations, some of the wireless sensor devices are connected directly to the IP network 220 using one or more wide area networks 206. The wide area networks 206 can include, for example, cellular network, satellite network, or other types of wide area networks.

The example main controller 230 can be included in the data aggregation system 115 of FIG. 1 or another back-end system. The main controller 230 can be a computing system that includes one or more computing devices or systems. The main controller 230 or any of its components can be located at a data processing center, a computing facility, or another location. In the example shown, the main controller 230 can remotely control operation of the wireless sensor devices. Example functions of the main controller 230 can include aggregating the information from some or all of the wireless sensor devices, upgrading the wireless sensor device software, monitoring states of the wireless sensor devices, etc. For example, the main controller 230 can include or be coupled to a software update module 234. In some cases, the software update module 234 can receive update for the wireless sensor device software 232, and push the software updates to wireless sensor devices.

In the example shown in FIG. 2, the main controller 230 can put the wireless sensor devices into one or more calibration or test modes, reset various elements within the wireless sensor devices, or configure any individual wireless sensor device as necessary, for example, based on the location or state of the wireless sensor device, its neighboring wireless sensor devices, or other factors. In some examples, the states of a wireless sensor device can include: (i) the temperature of the wireless sensor device, (ii) the current power consumption of the wireless sensor device, (iii) the data rate flowing from the wireless sensor device back to the main controller 230, (iv) the signal strength, SSID's, or MAC addresses of the local WiFi signals around the wireless sensor device, (v) the location of the wireless sensor device (e.g., detected an internal GPS unit in the wireless sensor device), (vi) a signal (e.g., IP packets, control signaling transmitted over the network) that provides information on the state of the wireless sensor device or its surrounding wireless sensor devices. The main controller 230 may monitor additional or different states of the wireless sensor devices.

In some implementations, the main controller 230 can include or be coupled to a communication system that receives spectrum inspection information (e.g., arrival-time data, spatial and temporal coordinates for each of the spectral-usage parameters, states of the wireless sensor devices, etc.) transmitted from the wireless sensor devices. The main controller 230 can include or be coupled to a data analysis system 236 that can aggregate (e.g., assemble, compile, or otherwise manage) the spectrum inspection information from the multiple wireless sensor devices and generate a spectral-usage report for the geographic region based on the spectral-usage parameters from the wireless sensor devices.

Figure 3A:
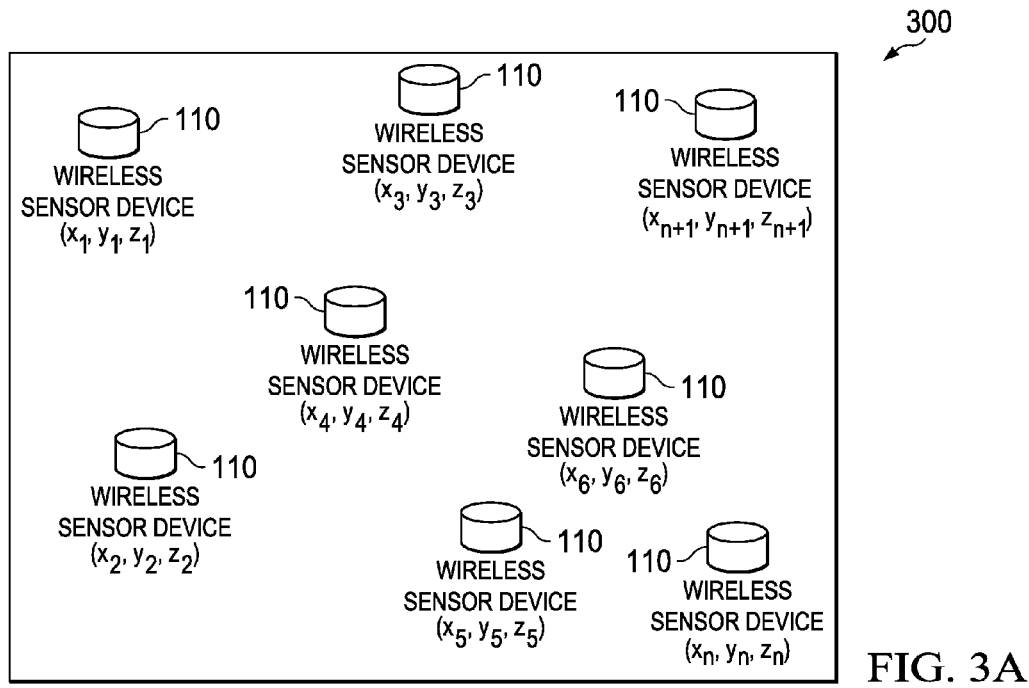
FIG. 3A is a block diagram showing an example distribution of wireless sensor devices.
Figure 3B:
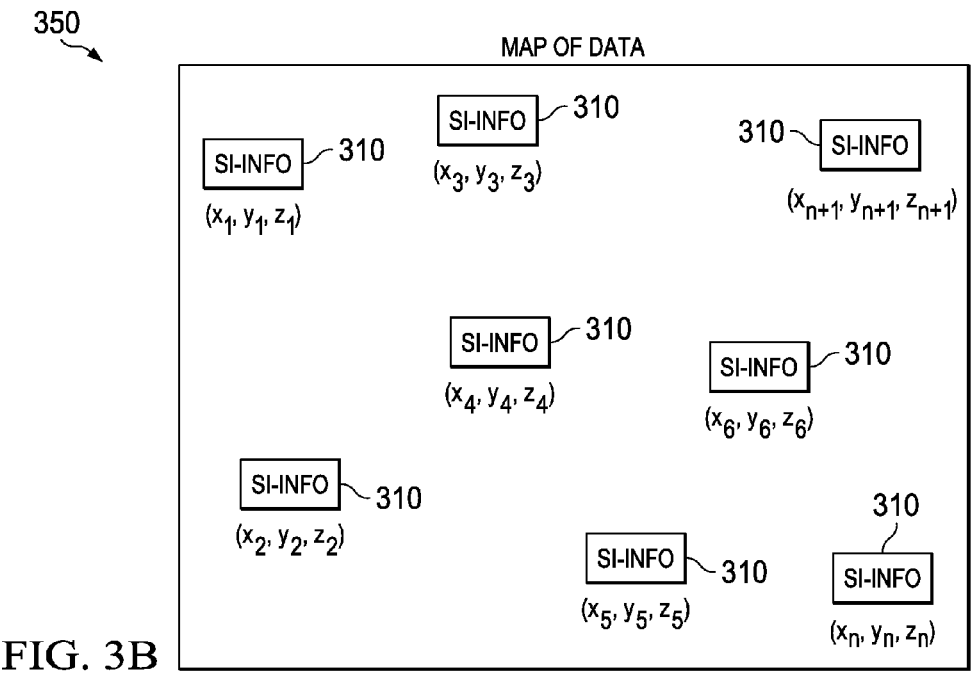
FIG. 3B is a block diagram showing example spectrum inspection (SI) information associated with wireless sensor devices.
Figure 4:
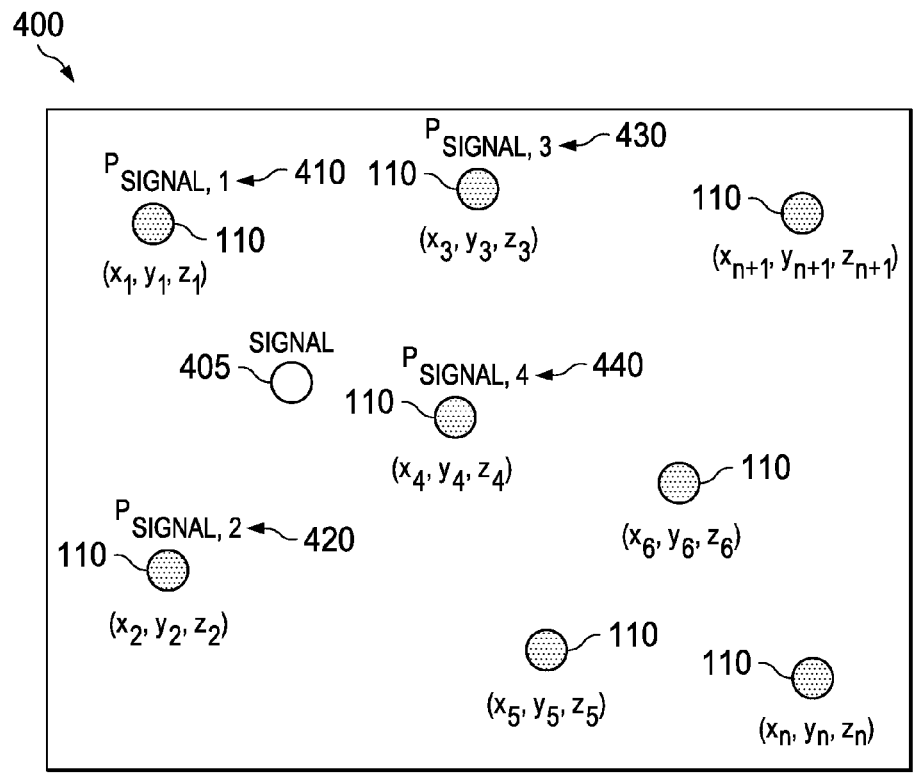
FIG. 4 is another block diagram showing example SI information associated with wireless sensor devices.

In some instances, the spectral-usage report can be presented on a data interface 238 to present users the usage, quality, or other information of the wireless-spectrum over the various locations of the wireless sensor devices. For example, the spectral-usage report can indicate detected wireless traffic levels in each of the multiple bandwidths in an RF spectrum, detected wireless traffic levels for multiple wireless communication standards, spatial and temporal distributions of wireless-spectrum usage in the geographic region, or other information. The traffic levels can include, for example, throughput, data rate, peak and valley values, or other statistics (e.g., average and variance) of the spectral-usage information. The spectral-usage report can include, for example, tables, charts, and graphs showing the detected wireless traffic levels versus space and time. For instance, the spectral-usage report can include a graph or map (e.g., as shown in FIGS. 3A, 3B, 4) showing the spatial distribution of wireless-spectrum usage in the geographic region. The spectral-usage report can include a bar chart or table showing the temporal distribution or trends of wireless-spectrum usage (e.g., showing the peak, average, and valley traffic amount during a day, a month, or a year). The spectral-usage report can indicate the locations of wireless sources that transmitted wireless signals in the geographic region. The locations can be indicated as coordinates, plots, etc.

In some cases, all or part of the spectral-usage report is generated based on combining simulated parameters of wireless-spectrum usage with measured parameters of wireless-spectrum usage. For instance, the spectral-usage report may include a simulated spatial distribution of a parameter (e.g., spectral power or any of the other parameters discussed above) that has been "corrected" or otherwise modified based on a spatial distribution of measurements obtained by the wireless sensor devices 110. For instance, the data analysis system 236 may generate an error mesh for a geographic region by identifying differences between the simulated spatial distribution and a measured spatial distribution and interpolating the differences. The error mesh can be updated dynamically as new measurements are obtained and used to dynamically refresh the spectral-usage report and the various data elements therein.

In some implementations, the data analysis system 236 can analyze real-time data, historical data, or a combination of both, and determine spectral-usage parameters for a geographic region. For example, the data analysis system 236 can determine a source location for the wireless signals received by the wireless sensor devices, and the generated spectral-usage report can include an indication of the source location.

FIGS. 3A and 3B show aspects of example spatial and temporal distributions of wireless-spectrum usage in a geographic region; FIG. 4 shows aspects of example techniques for determining the source location. In some instances, similar or related information can be included in a spectral-usage report generated by the main controller 230 and displayed to the users. In some implementations, the spectral-usage report can include additional or different representations of the spectral-usage information.

FIG. 3A is a block diagram 300 showing an example spatial distribution of wireless sensor devices. As shown in FIG. 3A, each wireless sensor device has a geographic location ($x_i$, $y_i$, $z_i$) and can monitor and analyze the wireless-spectrum at its respective geographic location ($x_i$, $y_i$, $z_i$). Each wireless sensor device can transmit spectrum inspection (SI) information to a data aggregation system (e.g., the main controller 230 in FIG. 2). The SI information can include, for example, spectrum data (e.g., spectral-usage parameters), arrival-time data for target signals, location and time information for each spectral-usage parameter, state information of the wireless sensor device, or other information. For example, the location and time information can include spatial coordinates of the wireless sensor device (e.g., ($x_i$, $y_i$, $z_i$) or in other coordinates) and temporal coordinates (e.g., a time of day) at which each of the spectral-usage parameters is obtained. The example block diagram 300 shows the spatial coordinates of the wireless sensor devices and serves as a map of the example spatial distribution of the wireless sensor devices in a geographic region. In some implementations, the SI information of each wireless sensor device can be superimposed onto the diagram 300 and displayed, for example, to a user.

FIG. 3B is block diagram 350 showing example SI information 310 associated with the wireless sensor devices shown in FIG. 3A. In the example shown in FIG. 3B, the example SI information 310 can be displayed adjacent to or on top of the respective spatial coordinates of the wireless sensor devices. The displayed SI information 310 can include some or all types of SI information described above. For example, one or more of the spectral-usage parameters can be displayed. In some implementations, temporal coordinates for each of the spectral-usage parameters can also be displayed. The information can be the same, similar, or different for each distinct wireless sensor device. Because the SI information 310 can be aggregated at a central location (e.g., the main controller 230), the SI information 310 of multiple wireless sensor devices can be correlated, compared, interpolated, or otherwise manipulated to derive further information. For example, the relative position of a source signal can be determined based on SI information of the wireless sensor devices that can detect the source signal. Additional or different information can be derived.

FIG. 4 is another block diagram 400 showing example SI information associated with the wireless sensor devices shown in FIG. 3A. In this example, a detected signal power at one or more frequencies is displayed as the example SI information for each wireless sensor device at its respective location. The measured power of the signal at frequency f at locations ($x_1$, $y_1$, $z_1$), ($x_2$, $y_2$, $z_2$), ($x_3$, $y_3$, $z_3$), and ($x_4$, $y_4$, $z_4$) are denoted as $P_{signal,1}$ 410, $P_{signal,2}$ 420, $P_{signal,3}$ 430, and $P_{signal,4}$ 440, respectively. Based on the measured power levels of the multiple wireless sensor devices, the source location of the signal 405 at frequency f can be estimated, for example, automatically by a data analysis system (e.g., of the central controller). For example, the source location of the signal 405 can be determined based on the intersection of multiple arcs centered at the locations of the wireless sensor devices, e.g., ($x_1$, $y_1$, $z_1$), ($x_2$, $y_2$, $z_2$), ($x_3$, $y_3$, $z_3$), and ($x_4$, $y_4$, $z_4$). The radius of each arc can be determined based on the $P_{signal,1}$ 410, $P_{signal,2}$ 420, $P_{signal,3}$ 430, and $P_{signal,4}$ 440, the respective path losses, shadowing effects, or other propagation conditions in the local wireless environment about each of the multiple wireless sensor devices. Accordingly, the source location of the RF signals can be pinpointed and illustrated on the example map for visualization. The source location can also be identified based on a synchronization signal as described below.

Figure 5A:
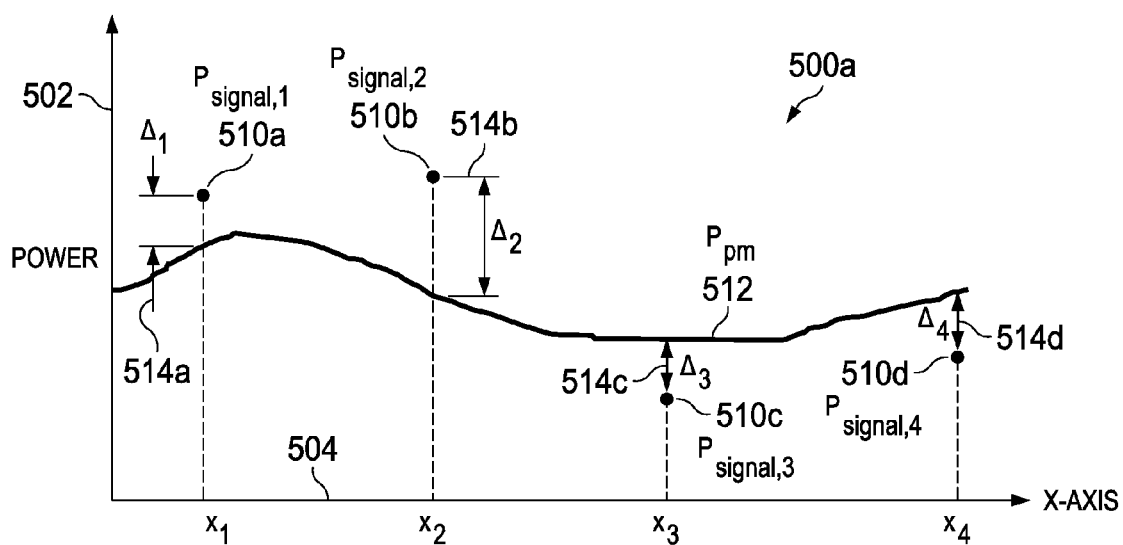
FIGS. 5A, 5B and 5C are plots showing aspects of an example technique for analyzing wireless signal propagation.
Figure 5B:
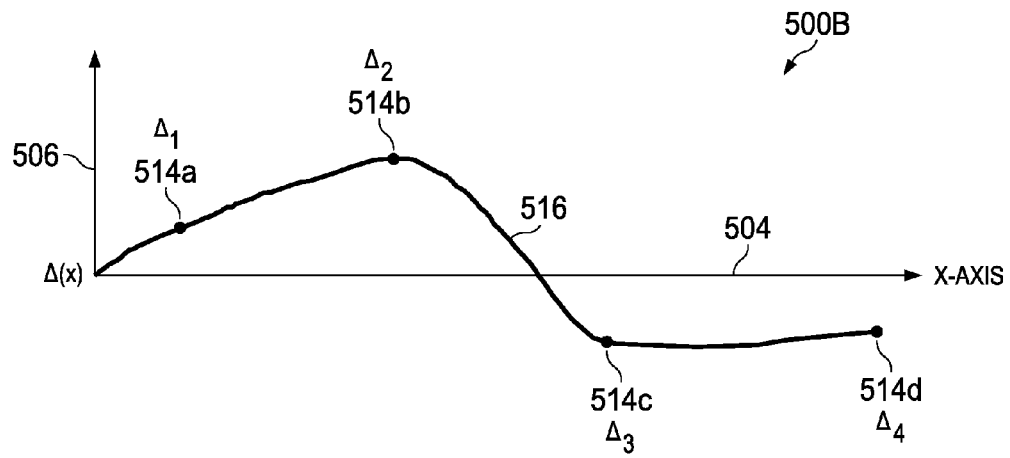
Figure 5C:
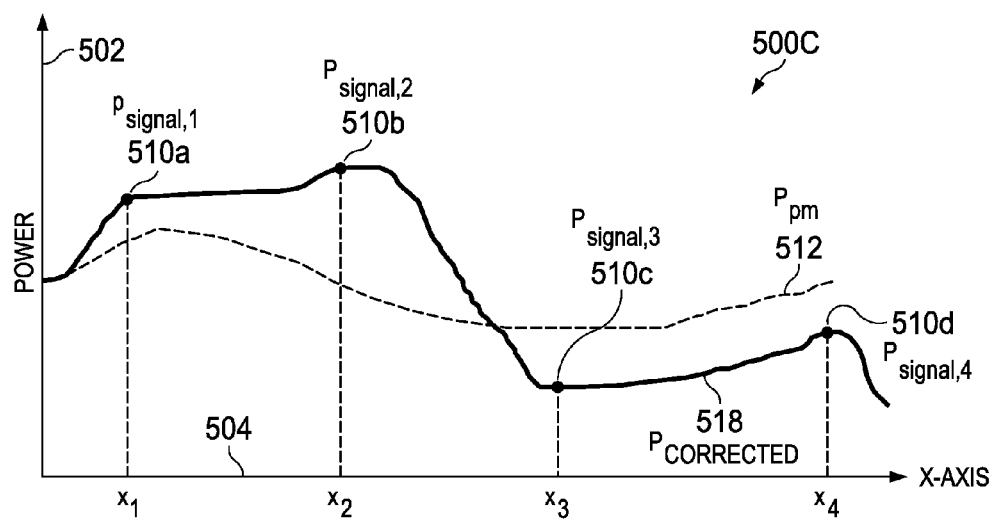

FIGS. 5A, 5B and 5C are plots 500a, 500b and 500c showing aspects of an example technique for analyzing wireless signal propagation. In some instances, the plots 500a, 500b, 500c can be generated based on one or more operations in the example process 1300 shown in FIG. 13, or the plots 500a, 500b, 500c may be generated based on another type of process. The plot 500a in FIG. 5A shows simulated and measured spatial distributions of a wireless signal parameter. The plot 500b in FIG. 5B shows an interpolated difference curve based on the difference values shown in FIG. 5A. The plot 500c in FIG. 5C shows a modified distribution of the wireless signal parameter. In these example plots, spectral power is plotted over one axis (the "x-axis" in the figures), and the analysis represented by these plots may be performed across one, two, or three spatial dimensions.

The plot 500A in FIG. 5A includes a vertical axis 502 that represents a range of values for a parameter (e.g., spectral power) of wireless signals in a geographic region, and a horizontal axis 504 that represents a range of locations in the geographic region. For example, the range of locations represented by the horizontal axis 504 may represent locations distributed across one, two or three spatial dimensions in a coverage area of the wireless communication network. The range of locations may extend over relatively short to long distances, for example, having an extent ranging from tens or hundreds of meters to multiple kilometers, and can generally represent any area of interest (e.g., a building, city block, jurisdiction, demographic, industry, etc.). In the example shown, the wireless signal parameter represented by the vertical axis 502 is power; other wireless signal parameters may be plotted and analyzed according to the example technique represented in FIGS. 5A-5C.

The plot 500A in FIG. 5A shows a simulated spatial distribution 512 generated by a simulation of wireless signal propagation in the geographic region, and data points 510a, 510b, 510c, 510d that form a measured spatial distribution that is based on local measurements of wireless signals in the geographic region. The simulated spatial distribution 512 represents spectral power values estimated by a radio propagation model along the x-axis. As an example, the simulated spatial distribution 512 may represent spectral power computed by a radio propagation model that simulates wireless signal propagation in the coverage area of a wireless communication network; and the data points 510a, 510b, 510c, 510d that form the measured spatial distribution may represent local spectral power measurements provided by wireless sensor devices based on wireless signals detected by the wireless sensor devices at their respective locations in the coverage area of the wireless communication network.

In some cases, the radio propagation model can produce a simulated spatial distribution having any desired spatial resolution. For example, the resolution of the simulated spatial distribution can be significantly higher (e.g., ten times higher or greater) than the resolution of the measured spatial distribution in some instances. In the example shown, the simulated spatial distribution 512 has a higher resolution than the data points 510a, 510b, 510c, 510d and appears as a continuous curve. Here, the simulated spatial distribution 512 can be represented as $P_{pm}(x)$, where pm="propagation model." The example data points 510a, 510b, 510c, 510d are local spectral power measurements provided by wireless sensors at points $x_1$, $x_2$, $x_3$ and $x_4$, respectively. The local spectral power measurements can be represented as spectral power values $P_{signal,1}$, $P_{signal,2}$, $P_{signal,3}$ and $P_{signal,4}$. As an example, the data points 510a, 510b, 510c, 510d may represent the SI-INFO 310 for four points of the type plotted in FIG. 3B.

The plot 500A in FIG. 5A also includes difference values 514a, 514b, 514c, 514d for each of the respective data points 510a, 510b, 510c, 510d. The difference value for each location along the horizontal axis 504 represents the difference between the simulated spatial distribution 512 and measured spatial distribution at that location. For instance, the difference value 514a at location $x_1$ represents the difference obtained by subtracting the value of the simulated spatial distribution 512 at location $x_1$ from the data point 510a at location $x_1$; the difference value 514b at location $x_2$ represents the difference obtained by subtracting the value of the simulated spatial distribution 512 at location $x_2$ from the data point 510b at location $x_2$; etc. The difference values 514a, 514b, 514c, 514d between the measured values (from the sensor devices) and the simulated values (from the propagation model) are labeled as $\Delta_1$, $\Delta_2$, $\Delta_3$ and $\Delta_4$, respectively. Here $\Delta_i = P_{signal,i} - P_{pm}(x_i)$, where i is an index going from 1 to 4.

The plot 500B in FIG. 5B includes the difference values 514a, 514b, 514c, 514d from FIG. 5A and an interpolated difference curve 516 plotted against the horizontal axis 504 from FIG. 5A. The vertical axis 506 in the plot 500B represents a range of values for the difference between the simulated and measured spatial distributions. The interpolated difference curve 516 is generated by interpolating the difference values 514a, 514b, 514c, 514d shown in the plot 500B. For instance, a difference function $\Delta(x)$ can be constructed using the values of $\Delta_i$ by curve fitting or another interpolation technique. The difference function $\Delta(x)$ is represented in FIG. 5B by the interpolated difference curve 516.

The plot 500C in FIG. 5C includes an example of a modified spatial distribution 518 plotted against the same axes (502, 504) shown in FIG. 5A. The example modified spatial distribution 518 was generated based on the interpolated difference curve 516 (shown in FIG. 5B) with the simulated spatial distribution 512 (shown in FIGS. 5A and 5C). Here, the modified spatial distribution 518 represents a modified function that can be calculated, for example, using:

$$P_{corrected}(x) = P_{pm}(x) + \Delta(x).$$

In this example, $P_{corrected}(x)$ can be interpreted as a corrected or otherwise modified spectral power over the x-axis. For instance, the modified spatial distribution 518 may represents a correction to the simulated spatial distribution 512, where the correction is based on local measurements of the relevant parameter obtained at measurement locations ($x_1$, $x_2$, $x_3$, $x_4$) distributed over the geographic region. In some examples, the modified spatial distribution 518 can be further refined or updated (e.g., based on subsequent or additional measurements at the same or other locations in the geographic region).

Figure 6:
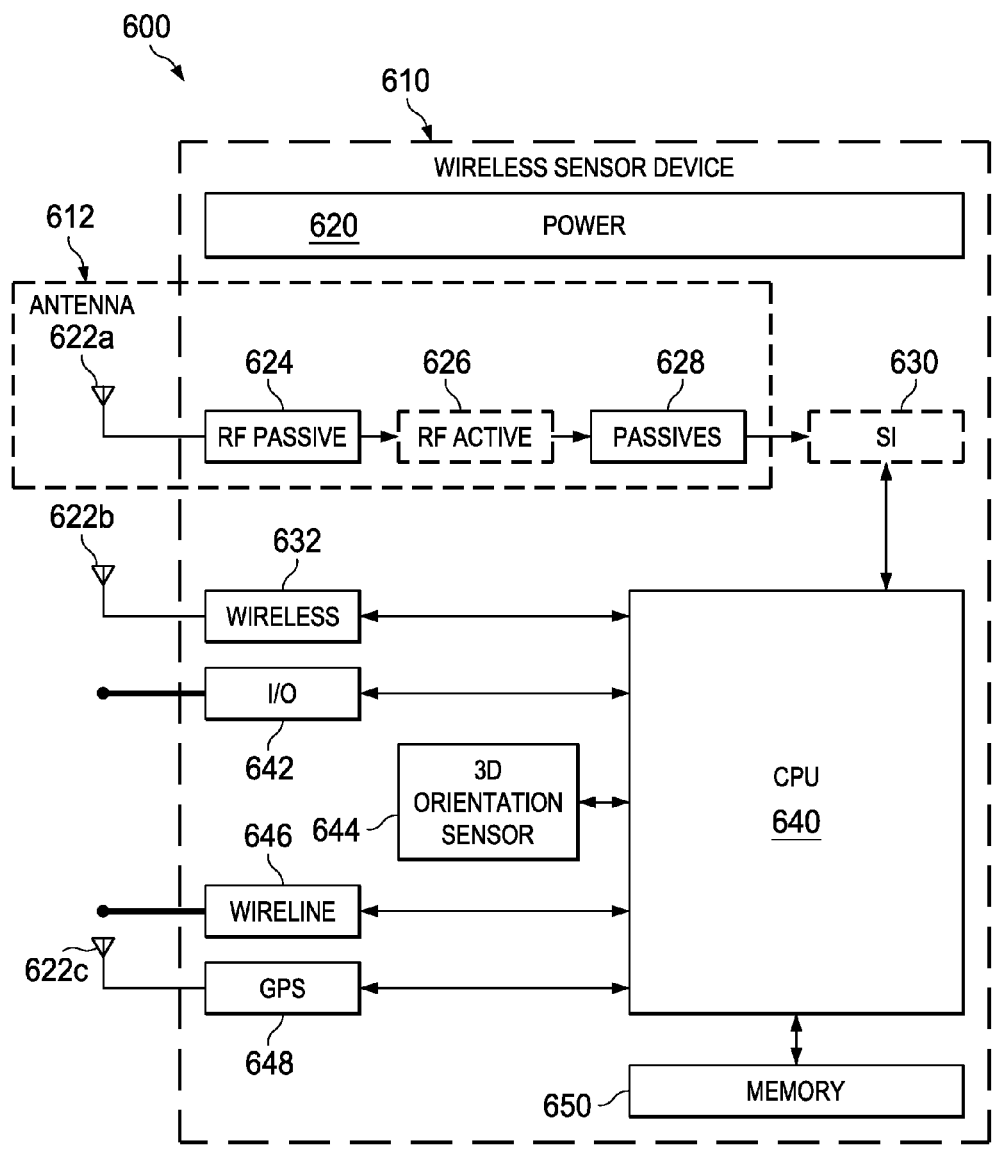
FIG. 6 is a block diagram showing an example wireless sensor device.

FIG. 6 is a block diagram showing an example wireless sensor device 600. In some cases, the wireless sensor devices of FIGS. 1-5 can be implemented as the example wireless sensor device 600 shown in FIG. 6 or as another type of wireless sensor device. The example wireless sensor device 600 includes a housing 610, an RF interface 612, a power management subsystem 620, a signal analysis subsystem (e.g., the SI subsystem 630, etc.), a CPU 640, a memory 650, communication interfaces, an input/output interface 642 (e.g., a USB connection), a GPS interface 648, and one or more sensors (e.g., 3D orientation sensors 644 such as a compass or gyroscope, temperature sensors, etc.). The wireless sensor device 600 can include additional or different components and features, and the features of the wireless sensor device can be arranged as shown in FIG. 6 or in another suitable configuration.

In some implementations, the housing 610 can be a portable housing that houses the RF interface 612, the power management subsystem 620, the signal analysis subsystem, the communication interfaces, and other components of the wireless sensor device 600. The housing can be made of plastic, metal, composites, or a combination of these and other materials. The housing can include components that are manufactured by molding, machining, extruding, or other types of processes. In some implementations, the wireless sensor device 600 can be coupled to or integrated with another device (e.g., a pico/femto cell box of a cellular system, a WiFi access point or base station, a vehicle, a router, a mobile device, a thermostat, etc.). For example, the housing 610 of the wireless sensor device 600 can be attached to, incorporated, or otherwise coupled to the other device. Alternatively, the housing 610 can be a dedicated housing that houses only the components of the wireless sensor device 600.

In some implementations, the design and arrangement of the housing 610 and components inside the housing 610 can be optimized or otherwise configured for monitoring and analyzing wireless signals. For example, the sizes, orientations, and relative locations of the components can be optimized for detecting and analyzing RF signals, and the device can be compact while accommodating all the necessary components. In some instances, the housing 610 can be on the order of, for example, $10 \times 10 \times 4$ cm$^3$, or another size housing can be used.

In some implementations, the RF interface 612 is configured to detect RF signals in multiple bandwidths of an RF spectrum in a local wireless environment about the wireless sensor device 600. The RF interface 612 can include an antenna system and multiple radio paths that are configured to process RF signals in the respective bandwidths. In the example shown in FIG. 6, the RF interface 612 includes an antenna 622a, RF passive elements 624, RF active elements 626, and passive elements 628. The RF passive elements 624 can include, for example, matching elements, RF switches, and filters. The RF active elements 626 can include, for example, RF amplifiers. The passive elements 628 after the RF active elements 626 can include, for example, filters, matching elements, switches, and baluns.

In some examples, the signal analysis subsystem can be configured to identify the arrival-time data based on the RF signals and a synchronization signal. A signal analysis subsystem can include radio(s), digital signal processor (DSP), memory, and other components for extracting spectral parameters and for analyzing the RF spectrum. In some implementations, the combination of the RF interface 612 and the signal analysis subsystem can be referred to as a spectrum inspection (SI) signal path, which is described in greater detail with respect to FIG. 7.

The communication interfaces of the wireless sensor device 600 can be configured to transmit the spectral-usage parameters or other SI information to a remote system (e.g., the main controller 230 of FIG. 2). The communication interfaces can include one or more wireless interfaces 632 (e.g., a WiFi connection, cellular connection, etc.), a wireline interface 646 to a local network (e.g., an Ethernet connection, xDSL connection, etc.), or other types of communication links or channels. The communication interfaces can share and reuse the common antennas (e.g., using an antenna array) or they can each have distinct and dedicated antennas.

The wireless interface 632 and the wireline interface 646 can each include a modem to communicate with the local or wide area network. For example, the wireless interface 632 and the wireline interface 646 can send SI information to a data aggregation system (e.g., the main controller 230 of FIG. 2) and receive control information (e.g., software updates) from the data aggregation system, via the local or wide area network. In some implementations, a wireless sensor device can be equipped with either or both of the communication interfaces. The wireline interface 646 can allow the example wireless sensor device 600 to exploit existing wireline communication infrastructure (e.g., in a building) and large transmission capacity of wireline communications (e.g., large bandwidth provided by optical network, advanced digital subscriber line technologies, etc.). The wireless interface 632 can enhance the mobility and flexibility of the example wireless sensor device 600 such that it can deliver SI information at a variety of locations and times, using Bluetooth, WiFi, cellular, satellite, or other wireless communication technologies.

In some implementations, the wireless interface 632 and the RF interface 612 can share hardware or software components (or both). In some implementations, the wireless interface 632 and the RF interface 612 can be implemented separately. In some implementations, the RF interface 612 is mainly responsible for signal reception rather than transmission, and the RF interface 612 can be implemented with specialized lower-power circuitry and thus reduce the overall power consumption of the wireless sensor device 600.

The power management subsystem 620 can include circuits and software for providing and managing power to the wireless sensor device 600. In some implementations, the power management subsystem 620 can include a battery interface and one or more batteries (e.g., rechargeable batteries, a smart battery with an embedded microprocessor, or a different type of internal power source). The battery interface may be coupled to a regulator, which may assist the battery in providing direct current electrical power to the wireless sensor device 600. As such, the wireless sensor device 600 can include a self-contained power supply and can be used at arbitrary locations without need for other external energy sources. Additionally or alternatively, the power management subsystem 620 can include an external power interface that receives power from an external source (e.g., an alternating current power source, an adapter, a converter, etc.). As such, the wireless sensor device 600 can be plugged into an external energy source.

In some implementations, the power management subsystem 620 can oversee and manage power consumption of the wireless sensor device 600. For example, the power management subsystem 620 can monitor the power consumption of the RF interface 612, communication interfaces, the CPU 640, and other components of the wireless sensor device 600, and report the power consumption state of the wireless sensor device 600, for example, to a central controller. In some implementations, the wireless sensor device 600 can be designed to have low power consumption, and the power management subsystem 620 can be configured to send an alert to the central controller or intervene with the operations of the wireless sensor device 600 if the power consumption exceeds a threshold. The power management subsystem 620 can include additional or different features.

The CPU 640 can include one or more processors or another type of data-processing apparatus that can execute instructions, for example, to manage the operations of the wireless sensor device 600. The CPU 640 may perform or manage one or more of the operations of a wireless sensor device described with respect to FIGS. 1-5. In some implementations, the CPU 640 can be part of the SI subsystem 630. For example, the CPU 640 can process, compute, and otherwise analyze the measured wireless-spectrum data (e.g., from the RF interface 612). In some cases, the CPU 640 can execute or interpret software, scripts, programs, functions, executables, or other modules contained in the memory 650.

The input/output interface 642 can be coupled to input/output devices (e.g., a USB flash drive, a display, a keyboard, or other input/output devices). The input/output interface 642 can assist data transfer between the wireless sensor device 600 and the external storage or display device, for example, over communication links such as a serial link, a parallel link, a wireless link (e.g., infrared, radio frequency, or others), or another type of link.

The memory 650 can include, for example, a random access memory (RAM), a storage device (e.g., a writable read-only memory (ROM) or others), a hard disk, or another type of storage medium. The memory 650 can store instructions (e.g., computer code) associated with operations of the wireless sensor device 600, a main controller, and other components in a wireless-spectrum analysis system. The memory 650 can also store application data and data objects that can be interpreted by one or more applications or virtual machines running on the wireless sensor device 600. The memory 650 can store, for example, location data, environment data, and state data of the wireless sensor device 600, wireless-spectrum data, and other data.

In some implementations, the wireless sensor device 600 can be programmed or updated (e.g., reprogrammed) by loading a program from another source (e.g., from a central controller through a data network, a CD-ROM, or another computer device in another manner). In some instances, the central controller pushes software updates to the wireless sensor device 600 as the updates become available, according to a predetermined schedule, or in another manner.

Figure 7:
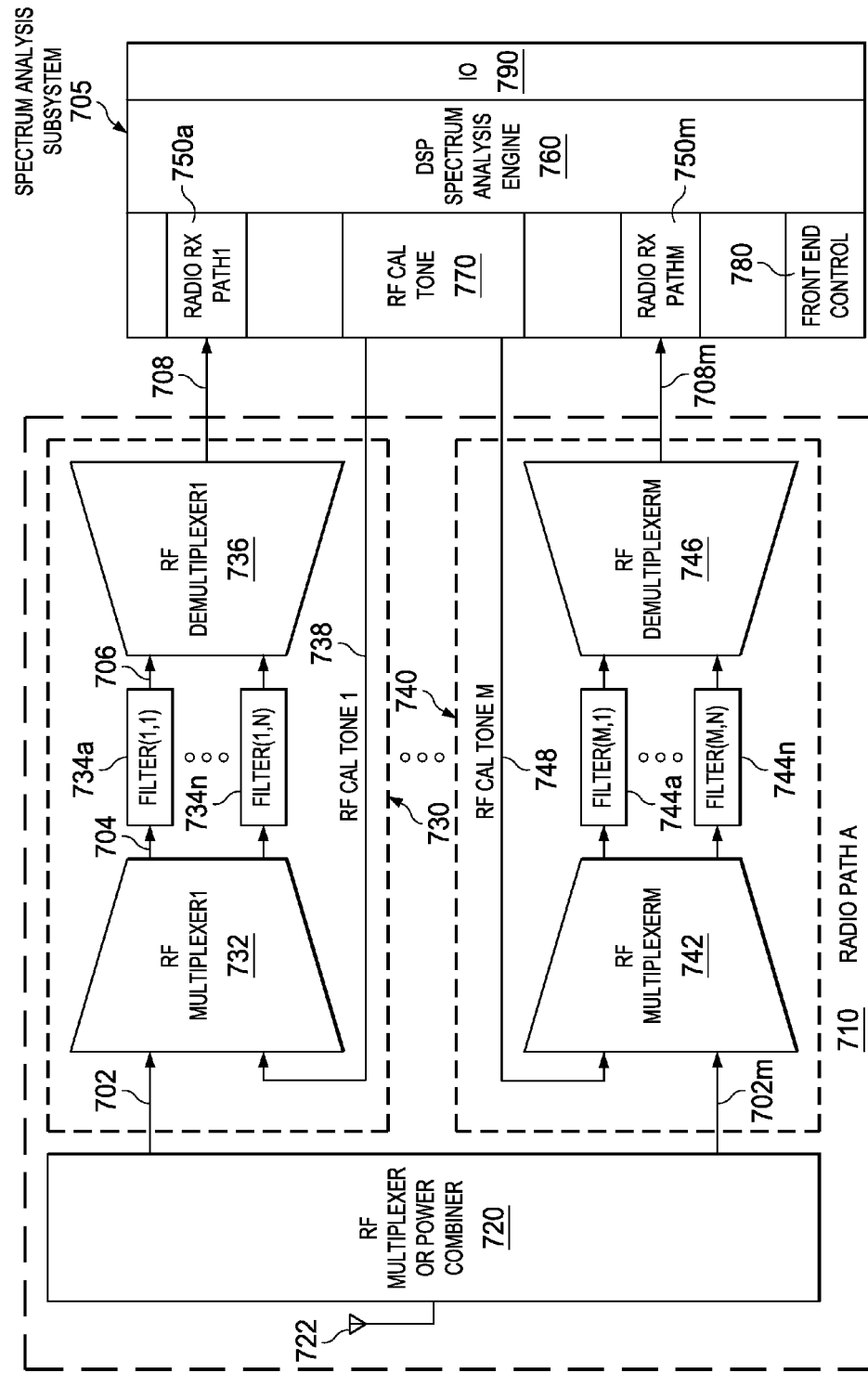
FIG. 7 is a block diagram showing an example SI signal path of a wireless sensor device.

FIG. 7 is a block diagram showing an example spectrum inspection (SI) signal path 700. The SI signal path 700 includes an RF interface 710 (e.g., denoted as Radio Path A) and a spectrum analysis subsystem 705. The RF interface 612 of the wireless sensor device 600 of FIG. 6 can be implemented as the example RF interface 710 in FIG. 7 or in another manner. The SI subsystem 630 of the wireless sensor device 600 of FIG. 6 can be implemented as the example spectrum analysis subsystem 705 in FIG. 7 or in another manner. In some cases, the SI signal path 700 can perform all necessary operations for monitoring and analyzing the wireless signals. For example, the SI signal path 700 can perform functions of a typical wireless receiver such as demodulation, equalization, channel decoding, etc. The SI signal path 700 can support signal reception of various wireless communication standards and access the spectrum analysis subsystem 705 for analyzing the wireless signals.

In the example shown, the RF interface 710 can be a wideband or narrowband front-end chipset for detecting and processing RF signals. For example, the RF interface 710 can be configured to detect RF signals in a wide spectrum of one or more frequency bands, or a narrow spectrum within a specific frequency band of a wireless communication standard. In some implementations, an SI signal path 700 can include one or more RF interfaces 710 to cover the spectrum of interest. Example implementations of such an SI signal path are described with respect to FIG. 8.

In the example shown in FIG. 7, the RF interface 710 includes one or more antennas 722, an RF multiplexer 720 or power combiner (e.g., an RF switch), and one or more signal processing paths (e.g., "path 1" 730, . . . , "path M" 740). The antenna 722 could be a multi-port antenna or single-port antenna. The antenna 722 can include an omnidirectional antenna, a directional antenna, or a combination of one or more of each. The antenna 722 is connected to an RF multiplexer 720. In some implementations, the RF interface 710 can be configured to use the one or more antennas 722 for detecting the RF signals based on single-input single-output (SISO), single-input and multiple-output (SIMO), multiple-input and single-output (MISO) or multiple-input and multiple-output (MIMO) technologies.

In some implementations, an RF signal in the local environment of a wireless sensor device can be picked up by the antenna 722 and input into the RF multiplexer 720. Depending on the frequency of the RF signal that needs to be analyzed, the signal 702 output from the RF multiplexer 720 can be routed to one of the processing paths (i.e., "path 1" 730, . . . , "path M" 740). Here, M is an integer. Each path can include a distinct frequency band. For example, "path 1" 730 may be used for RF signals between 1 GHz and 1.5 GHz, while "path M" may be used for RF signals between 5 GHz and 6 GHz. The multiple processing paths may have a respective central frequency and bandwidth. The bandwidths of the multiple processing paths can be the same or different. The frequency bands of two adjacent processing paths can be overlapping or disjointed. In some implementations, the frequency bands of the processing paths can be allocated or otherwise configured based on the assigned frequency bands of different wireless communication standards (e.g., GSM, LTE, WiFi, etc.). For example, it can be configured such that each processing path is responsible for detecting RF signals of a particular wireless communication standard. As an example, "path 1" 730 may be used for detecting LTE signals, while the "path M" 740 may be used for detecting WiFi signals.

Each processing path (e.g., "processing path 1" 730, "processing path M" 740) can include one or more RF passive and RF active elements. For example, the processing path can include an RF multiplexer, one or more filters, an RF de-multiplexer, an RF amplifier, and other components. In some implementations, the signals 702, 702m output from the RF multiplexer 720 can be applied to a multiplexer in a processing path (e.g., "RF multiplexer 1" 732, . . . , "RF multiplexer M" 742). For example, if "processing path 1" 730 is selected as the processing path for the signal 702, the signal 702 can be fed into "RF multiplexer 1" 732. The RF multiplexer can choose between the signal 702 coming from the first RF multiplexer 720 or the RF calibration (cal) tone 738 provided by the spectrum analysis subsystem 705. The output signal 704 of "RF multiplexer 1" 732 can go to one of the filters, Filter(1,1) 734a, . . . , Filter (1,N) 734n, where N is an integer. The filters further divide the frequency band of the processing path into a narrower band of interest. For example, "Filter(1, 1)" 734a can be applied to the signal 704 to produce a filtered signal 706, and the filtered signal 706 can be applied to "RF de-multiplexer 1" 736. In some instances, the signal 706 can be amplified in the RF de-multiplexer. The amplified signal 708 can then be input into the spectrum analysis subsystem 705.

Similarly, if "processing path M" 740 is selected as the processing path for the signal 702m, the signal 702m can be fed into "RF multiplexer M" 742. The RF multiplexer can choose between the signal 702m coming from the first RF multiplexer 720 or the RF calibration (cal) tone 748 provided by the spectrum analysis subsystem 705. The output signal of "RF multiplexer M" 742 can go to one of the filters, Filter(M, 1) 744a, . . . , Filter (M,N) 744n, where N is an integer. In some instances, the output signal of the filters can be amplified in the RF de-multiplexer 746. The amplified signal 708m can then be input into the spectrum analysis subsystem 705.

The spectrum analysis subsystem 705 can be configured to convert the detected RF signals into digital signals and perform digital signal processing to identify information based on the detected RF signals. The spectrum analysis subsystem 705 can include one or more SI radio receive (RX) paths (e.g., "SI radio RX path 1" 750a, "SI radio RX path M" 750m), a DSP spectrum analysis engine 760, an RF calibration (cal) tone generator 770, a front-end control module 780, and an I/O 790. The spectrum analysis subsystem 705 may include additional or different components and features.

In the example shown, the amplified signal 708 is input into "SI radio RX path 1" 750a, which down-converts the signal 708 into a baseband signal and applies gain. The down-converted signal can then be digitalized via an analog-to-digital converter. The digitized signal can be input into the DSP spectrum analysis engine 760. The DSP spectrum analysis engine 760 can, for example, identify packets and frames included in the digital signal, read preambles, headers, or other control information embedded in the digital signal (e.g., based on specifications of a wireless communication standard), determine the signal power and SNR of the signal at one or more frequencies or over a bandwidth, channel quality and capacity, traffic levels (e.g., data rate, retransmission rate, latency, packet drop rate, etc.), or other spectral-usage parameters. The output (e.g., the spectral-usage parameters) of the DSP spectrum analysis engine 760 can be applied and formatted to the I/O 790, for example, for transmission of the spectral-usage parameters to the data aggregation system via one or more communication interfaces of the wireless sensor device.

The RF calibration (cal) tone generator 770 can generate RF calibration (cal) tones for diagnosing and calibration of the radio RX paths (e.g., "radio RX path 1" 750a, . . . "radio RX path M" 750m). The radio RX paths can be calibrated, for example, for linearity and bandwidth.

Figure 8:
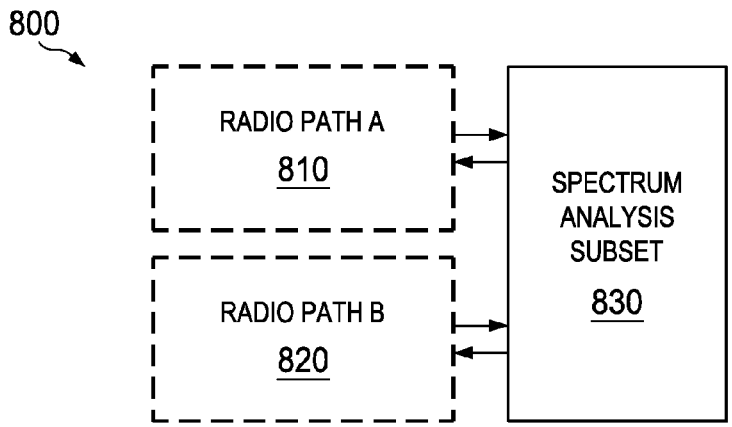
FIG. 8 is a block diagram showing another example SI signal path of a wireless sensor device.

FIG. 8 is a block diagram showing another example implementation of an SI signal path 800 of a wireless sensor device. In some instances, the SI signal path can include multiple RF interfaces (radio paths) that are connected to multiple different antennas. In the example shown in FIG. 8, the SI signal path 800 includes a radio path A 810 and a radio path B 820, each coupled to a spectrum analysis subsystem 830. The radio path A 810 and radio path B 820 can be configured in a similar manner as the RF interface or radio path A 710 of FIG. 7, or they can be configured in another manner. The radio path A 810 and radio path B 820 can have the same or different configuration, for example, covering the same or different frequency bands for wireless-spectrum monitoring and analysis.

Figure 9:
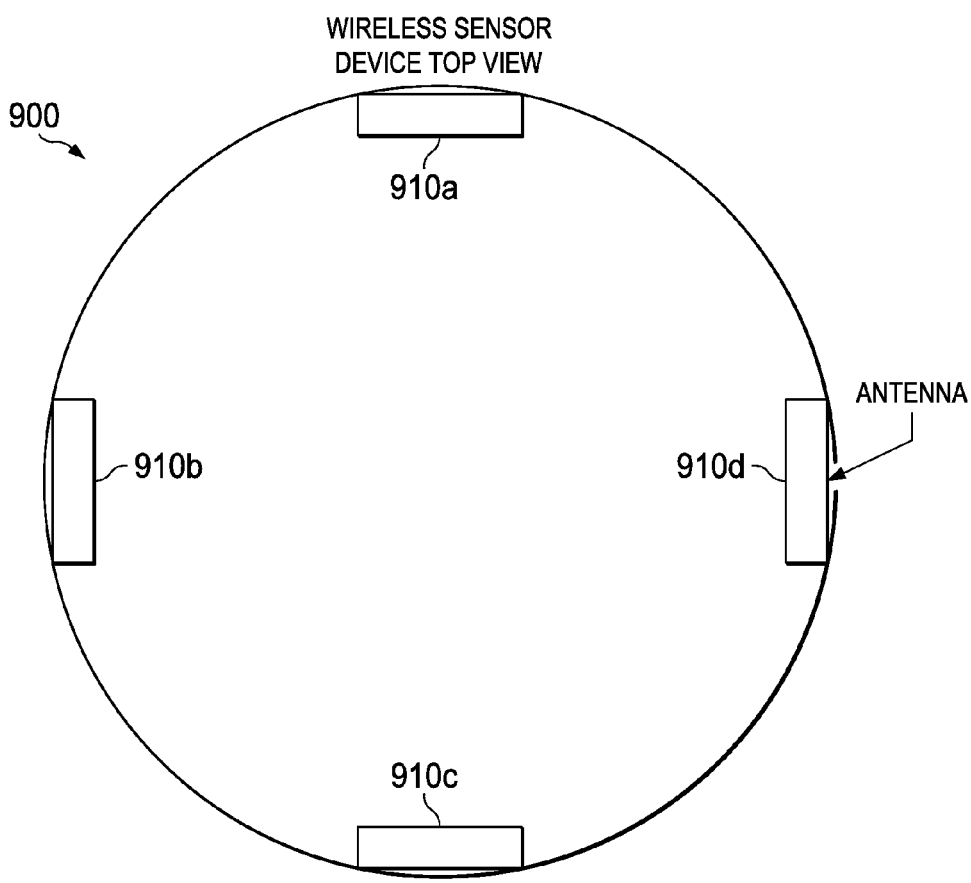
FIG. 9 is a top view of an example wireless sensor device.

FIG. 9 is a top view of an example wireless sensor device 900. In some cases, the wireless sensor devices of FIGS. 1-5 can be implemented as the example wireless sensor device 900 shown in FIG. 9 or as another type of wireless sensor device. The example wireless sensor device 900 in FIG. 9 can include some or all of the features shown in FIGS. 6-7, or the wireless sensor device 900 in FIG. 9 can include fewer, additional, or different features. The wireless sensor device 900 can include one or more antennas, for example, connected to one or more RF interfaces inside a housing of the wireless sensor device 900. For instance, the antennas of the example wireless sensor device 900 can be the antennas 622a-c of FIG. 6 or the antenna 722 of FIG. 7.

The antennas can be strategically arranged on the wireless sensor device 900 for reception of RF signals. The example wireless sensor device 900 shown in FIG. 9 includes four antennas 910a-d placed ninety degrees from each other relative to the center of the wireless sensor device 900. In some instances, the antennas can be arranged with a different degree of separation, orientation, or position, for example, based on the total number of antennas, the antenna profiles, the location and orientation of the wireless sensor device 900, or other factors.

Figure 10:
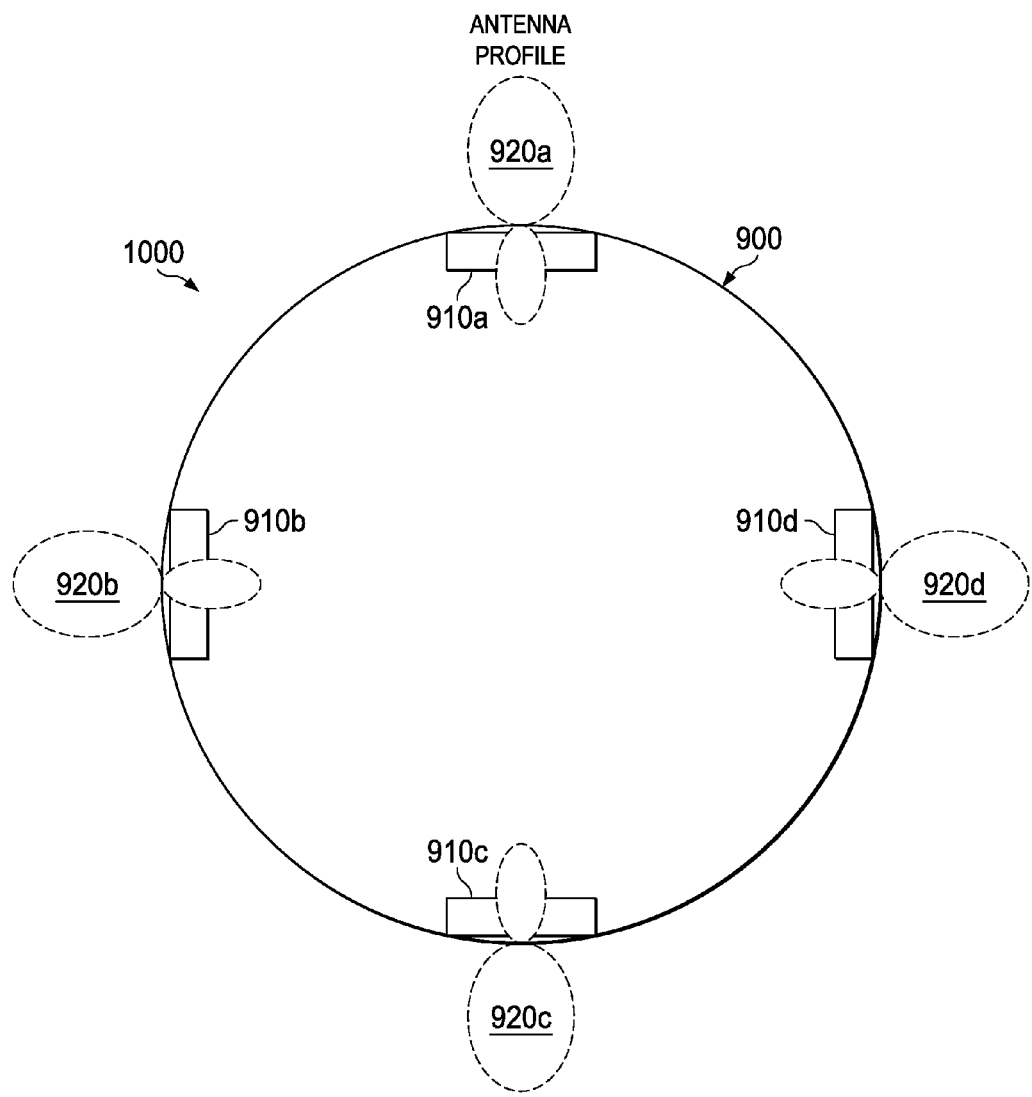
FIG. 10 is a top view of example antenna profiles of the antennas 910a-d of the example wireless sensor device 900 of FIG. 9.

FIG. 10 is a top view 1000 of example antenna profiles of the antennas 910a-d of the example wireless sensor device 900 of FIG. 9. In the example shown in FIG. 10, the antennas 910a-d have respective antenna profiles or patterns 920a-d, respectively. The antenna profiles 920a-d can be the same or different. The antenna profiles 920a-d can be selected or otherwise configured, for example, based on the frequency or frequency band of interest, the desired antenna gain, or other factors.

Figure 11:
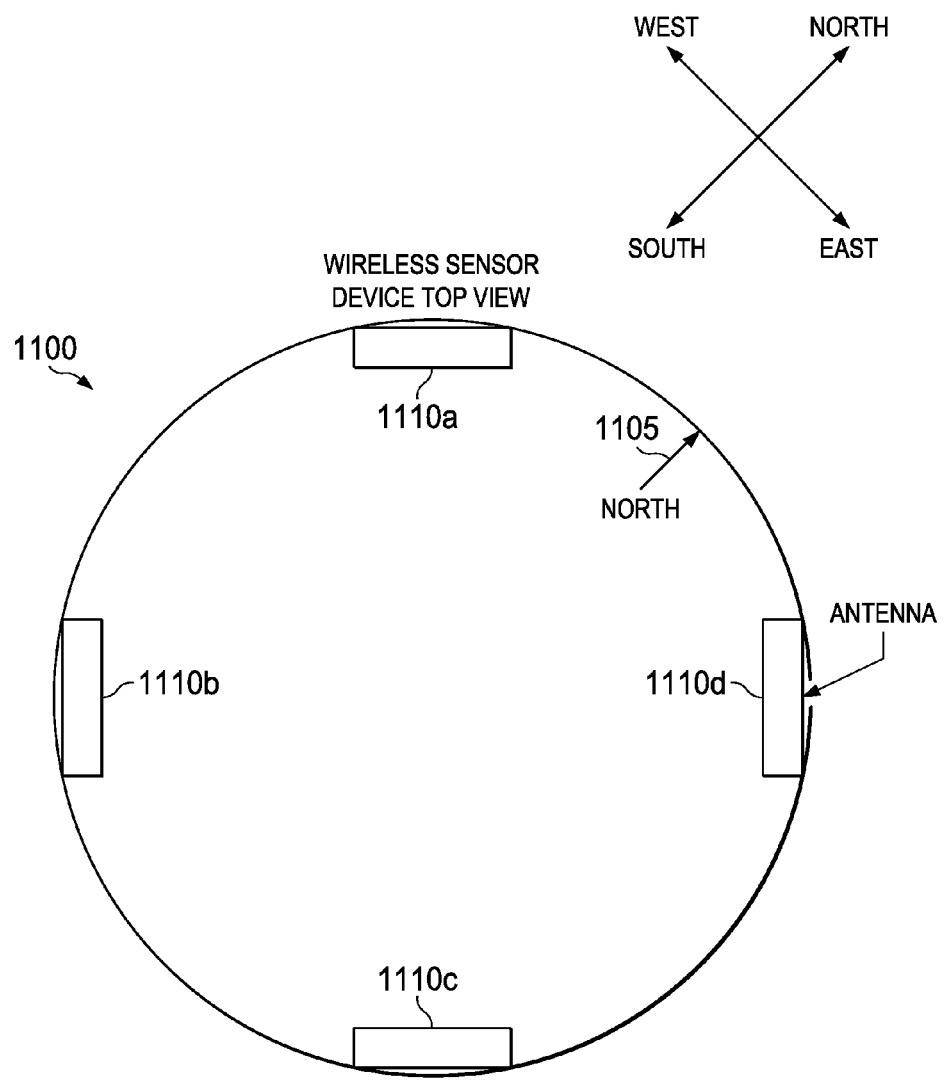
FIG. 11 is a top view of another example wireless sensor device.

FIG. 11 is a top view of another example wireless sensor device 1100. In some cases, the wireless sensor devices of FIGS. 1-5 can be implemented as the example wireless sensor device 1100 shown in FIG. 11 or as another type of wireless sensor device. The example wireless sensor device 1100 in FIG. 11 can include some or all of the features shown in FIGS. 6-10, or the wireless sensor device 1100 in FIG. 11 can include fewer, additional, or different features.

The wireless sensor device 1100 includes four antennas 1110a-d and a reference direction indicator 1105 on the wireless sensor device 1100. In some cases, the antennas 1110a-d are oriented or configured with respect to cardinal directions or another coordinate system according to the reference direction indicator 1105. In the example shown in FIG. 11, the reference direction indicator 1105 is oriented along the North compass direction. Another reference direction can be used. The orientations and displacements of the antennas 1110a-d can be identified and, in some cases, adjusted with respect to the reference direction indicator 1105.

In some implementations, a wireless sensor device can be a portable, modular device. For example, some wireless sensor devices can be moveable or reconfigurable for use in multiple locations (e.g., in series), without having to substantially deconstruct or disassemble the device. In some cases, wireless sensor devices are interchangeable with each other, so that the network of wireless sensor devices can be conveniently upgraded, expanded, tailored, or otherwise modified.

In some cases, a wireless sensor device can be installed by one or more operators, for example, by positioning the device and connecting it to standard power and data links. In some cases, a wireless sensor device can be secured in place by fasteners (e.g., screws, bolts, latches, adhesive, etc.), or a wireless sensor device can rest in a free position (e.g., without fasteners). In some instances, wireless sensor devices can operate in a variety of locations and environments. As an example, some wireless sensor devices can be installed in a vehicle (e.g., a car, a bus, a train, a ship, etc.) where the wireless sensor device can monitor and analyze the spectrum while in motion. In other examples, wireless sensor devices can be installed on traffic infrastructure, communication infrastructure, power infrastructure, dedicated real property, industrial systems, urban or commercial buildings, residential areas, and other types of locations.

Figure 12:
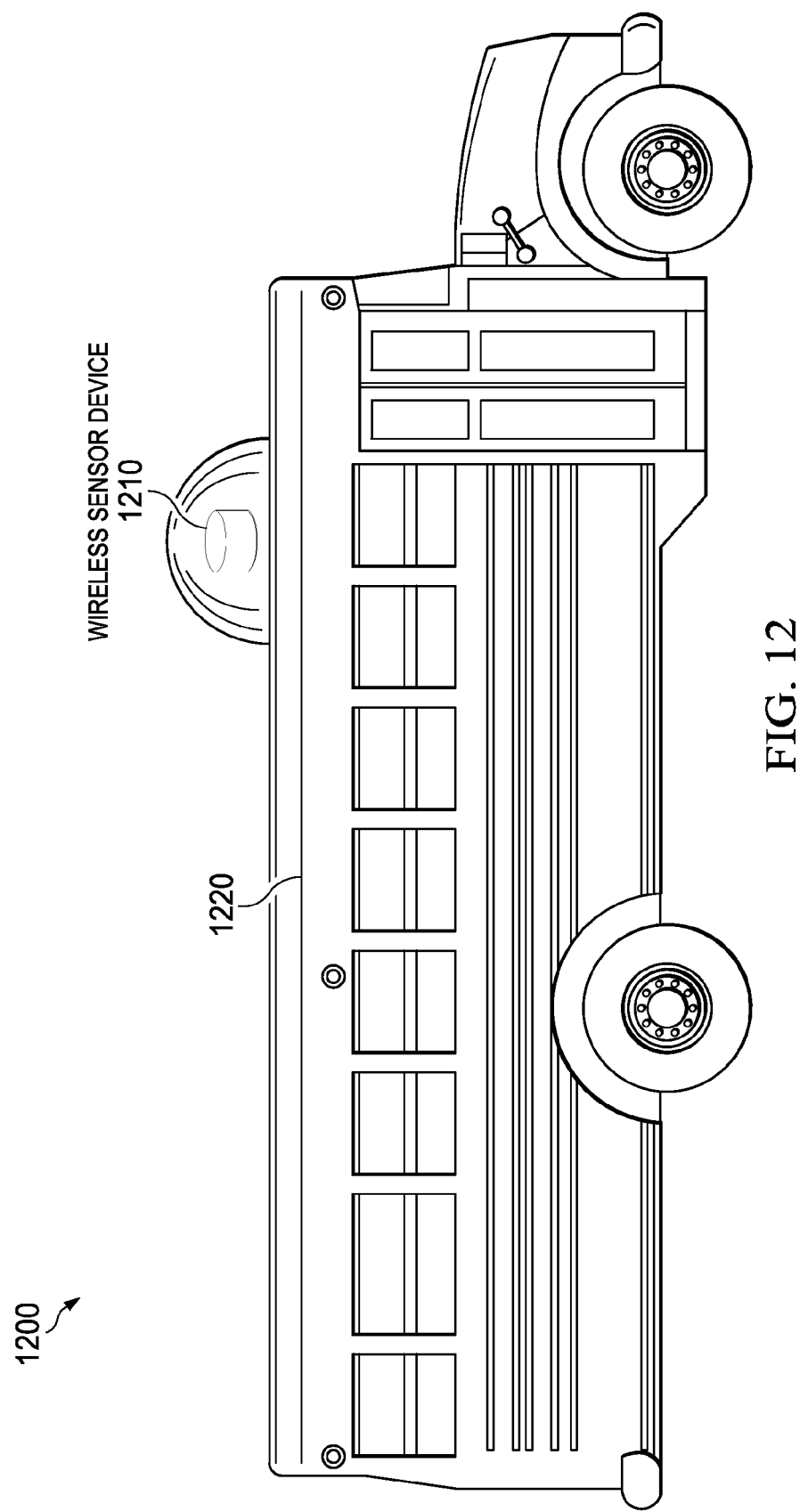
FIG. 12 is a diagram showing an example application of a wireless sensor device.

FIG. 12 is a block diagram 1200 showing an example application of a wireless sensor device 1210, where the wireless sensor device 1210 is mounted on a bus 1220. The wireless sensor device 1210 can record its varying geographic locations, monitor wireless signals at each location, and transmit the spectrum inspection information to a central controller as the bus 1220 moves. In some implementations, the wireless sensor device 1210 can be configured to monitor and analyze the spectrum used by passengers on the bus 1220. For example, the wireless sensor device 1210 may detect identifiers of cellphones used by the passengers, detect cellular or WiFi signals transmitted and received by the cellphones of the passengers, and derive spectral-usage parameters specific to the RF traffic occurring within or around the bus 1220. The wireless sensor device 1210 can be configured in another manner. In some cases, the wireless sensor device 1210 can leverage power and communication capabilities of the bus 1220, or the wireless sensor device 1210 can include independent power and communications capabilities.

Figure 13:
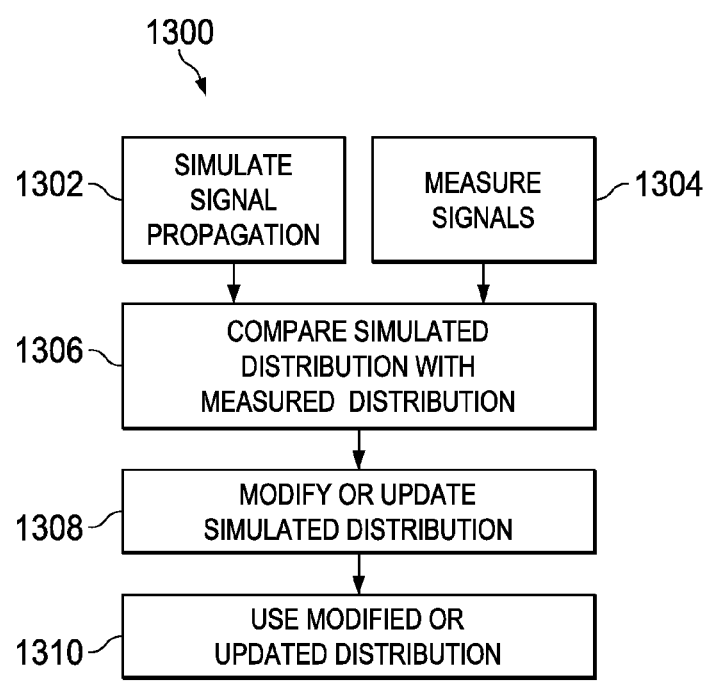
FIG. 13 is a flow chart showing an example technique for analyzing wireless signal propagation.

FIG. 13 is a flow chart showing an example process 1300 for analyzing wireless signal propagation. The example process 1300 can be performed, for example, by one or more components or subsystems in a wireless-spectrum analysis system (e.g., the example wireless-spectrum analysis system 100 shown in FIG. 1, the example wireless-spectrum analysis system 200 shown in FIG. 2, etc.) or by another type of system. In some cases, the example process 1300 may include additional or different operations, and the operations can be performed in the order shown or in another order. In some implementations, the process 1300 or individual operations or subsets of operations in the process 1300 can be iterated or repeated, for example, until a terminating condition is reached.

At 1302, wireless signal propagation is simulated for a geographic region. The simulation of wireless signal propagation in the geographic region can be performed, for example, by simulation software executed by a computer system. For instance, the signal propagation can be simulated by the data analysis system 236 shown in FIG. 2 or another type of computer system. In some implementations, the simulated wireless signals include radio frequency (RF) signals or wireless signals in other frequency ranges. The geographic region that is modeled in the simulation can be relatively small or large (e.g., having a radius ranging from tens or hundreds of meters to multiple kilometers) and can generally represent any area of interest (e.g., a building, city block, jurisdiction, demographic, industry, etc.).

In some implementations, the simulation of wireless signal propagation produces a simulated spatial distribution of spectral power (or another parameter of the wireless signals) for the geographic region. The simulated spatial distribution of spectral power can include simulated values of wireless signal power for an array of locations distributed over the geographic region. For example, the array of locations can be represented as a one-dimensional, two-dimensional or three-dimensional simulation grid (where each grid point is associated with a set of spatial coordinates), and the spatial distribution of spectral power can include a simulated value of signal power for each grid point in the one-dimensional, two-dimensional or three-dimensional simulation grid. The array of simulated locations may cover the entire geographic region or only a portion of the geographic region. The array of simulated locations may be distributed uniformly, non-uniformly, in a regular pattern, or in an irregular or random arrangement. The simulated spatial distribution 512 shown in FIG. 5A is an example of a simulated spatial distribution of spectral power for a geographic region, which may be applied over one, two or three spatial dimensions.

In some implementations, a radio propagation model may be used to simulate wireless signal propagation and to generate the simulated spatial distribution of spectral power (or to generate the simulated distribution of another parameter of wireless signals in the geographic region). Examples of radio propagation models include ray-tracing, the Okumura model, the Hata-Okumura model, the COST 231 Walfisch-Ikegami model and others. The parameters calculated by the radio propagation model can include any parameters of the wireless signals. For example, the parameters can include the frequency distribution of the spectrum, the spectral power for one or more frequencies or bandwidths, the signal quality (e.g., signal-to-noise, etc.), throughput, number of users or signal sources in the geographic region, or other types of parameters.

The ray-tracing technique is an example of a deterministic radio propagation model. In some examples, ray-tracing works by assuming electromagnetic waves can be modeled as a number of narrow beams (or rays). The beams are assumed to exist over some small distance over which they are assumed to be locally straight. The ray tracer will advance the ray over the next set of distances by using a local derivative of the medium. Properties of the ray that can be modeled include, for example, intensity, wavelength, or polarization.

The Okumura model is an example of an empirical radio propagation model. The Okumara model can be used, for instance, to determine radio propagation over an urban area. The Okumura model can be formally expressed as:

$$L = L_{FSL} + A_{MU} - H_{MG} - H_{BG} - \Sigma K_{correction}$$

where, L represents the median path loss in units of the Decibels (dB), $L_{FSL}$ represents the free space loss in units of Decibels, $A_{MU}$ represents the median attenuation in units of Decibels, $H_{MG}$ represents the Mobil station antenna height gain factor, $H_{BG}$ represents the base station antenna height gain factor and $K_{correction}$ represents a correction factor gain (such as, for example, the type of environment, water surfaces, isolated obstacle etc.). The COST 231 and Hata-Okumura models are other examples of empirical radio propagation models. These empirical radio propagation models are based on or similar to the Okumura model described above, but have a different equation that includes different coefficients and components.

In some implementations, signal propagation produced in the geographic region by a wireless communication network is simulated at 1302. For example, the wireless communication network can be a cellular network, a Wi-Fi network, or another type of wireless network. In such implementations, the simulation can produce a simulated spatial distribution of spectral power produced by the wireless communication network (e.g. a simulated spatial distribution of spectral power produced by a cellular network, a Wi-Fi network, or another type of wireless communication network).

At 1304, wireless signals are detected in the geographic region. The wireless signals can be detected, for example, by wireless sensor devices distributed over the geographic region. For instance, all or some of the network of wireless sensor devices 110 shown in FIG. 1 may be used to measure wireless signals. In some implementations, the measured wireless signals include radio frequency (RF) signals or wireless signals in other frequency ranges. The wireless signals may be detected at an array of sensor locations that are distributed over all or part of the geographic region. In some instances, each sensor device identifies a local parameter (e.g., a local spectral power measurement) for its respective location based on the wireless signals detected by the sensor device at the respective location. The local parameter identified by each sensor device represents an attribute (e.g., the power) of the wireless signals detected at a particular location in the geographic region. The parameters identified by the wireless sensor devices can include any parameters of the wireless signals. For example, the parameters can include the frequency distribution of the spectrum, the spectral power for one or more frequencies or bandwidths, the signal quality (e.g., signal-to-noise, etc.), throughput, number of users or signal sources in the geographic region, or other types of parameters.

In some implementations, the parameters identified by each wireless sensor device are transmitted from the wireless sensor device to a remote system. For example, the wireless sensor devices 110 shown in FIG. 1 may monitor wireless-spectrum usage concurrently at their respective wireless-spectrum monitoring locations, identify parameters of detected wireless signals, and transmit the parameters (in some cases, with additional data) to the data aggregation system 115. In some cases, the parameters are sent with time and location information, such as, for example, a time stamp indicating a time associated with the parameter, a device or location identifier indicating a location associated with the parameter, etc. The parameters identified by the network of wireless sensor devices and associated data can be aggregated at a central database (e.g., at the data analysis system 236 shown in FIG. 2, or another type of computing system).

In some implementations, the wireless signal measurements (e.g., local spectral power measurements or local measurements of other parameters) from an array of sensor locations are aggregated to form a measured spatial distribution. For instance, local spectral power measurements from the array of sensor locations can be aggregated to form a measured spatial distribution of spectral power for the geographic region. The array of sensor locations can form a one-dimensional, two-dimensional or three-dimensional grid (where each grid point is associated with a set of spatial coordinates), and the measured spatial distribution of spectral power can include a measured value of signal power for each grid point in the two-dimensional or three-dimensional grid. The array of sensor locations can be different from the array of simulated locations. For example, the array of sensor locations can be determined independent of the simulated locations, and may be more sparse or more dense than the array of simulated locations in some or all regions. In some instances, the array of sensor locations covers the entire geographic region or only a portion of the geographic region. The array of sensor locations may be distributed uniformly, non-uniformly, in a regular pattern, or in an irregular or random arrangement. The measured spatial distribution represented by the data points 510a, 510b, 510c, 510d shown in FIG. 5A is an example of a measured spatial distribution of spectral power for a geographic region, which may be applied over one, two or three spatial dimensions.

In some implementations, signals produced in the geographic region by a wireless communication network are measured at 1304. For example, the wireless communication network can be the cellular network, a Wi-Fi network, or another type of wireless network that is simulated at 1302. In such implementations, the measurements can produce a measured spatial distribution of spectral power produced by the wireless communication network (e.g. a measured spatial distribution of spectral power produced by a cellular network, a Wi-Fi network, or another type of wireless communication network). In some implementations, the wireless sensor devices passively monitor network signals formatted according to any of multiple distinct network standards or formats. For instance, the wireless sensor devices may receive signals exchanged between devices operating in the network while the wireless sensor devices do not send signals to or request services from devices and the network.

At 1306, a simulated distribution is compared with a measured distribution. For example, a simulated spatial distribution of a parameter (e.g., spectral power, signal quality, throughput, number of users, etc.) can be compared with a measured spatial distribution of the same parameter. In this example, the simulated distribution is obtained from the simulation of signal propagation at 1302, and the measured distribution is obtained from the signal measurements at 1304. For instance, the simulated distribution and the measured distribution can be obtained by a computer system, such as, for example, the data analysis system 236 shown in FIG. 2 or another type of computing system. The computer system that obtains the distributions can perform the comparison, for example, by processing the distributions according to an algorithm.

In some implementations, the simulated distribution is compared with the measured distribution by identifying differences between the simulated distribution and the measured distribution for each of a plurality of locations in a geographic region. As an example, a measured value of spectral power that was measured at or near a particular location in the geographic region can be subtracted from the simulated value of spectral power that was simulated for the same location or a nearby location in the geographic region. The difference values 514*a*, 514*b*, 514*c*, 514*d* shown in FIG. 5A and FIG. 5B are examples of differences identified by subtracting the measured values of spectral power from simulated values of spectral power.

In some implementations, the simulated distribution represents a simulation of signal propagation produced by a wireless communication network, and the measured distribution represents a measurement of signal propagation produced by the wireless communication network. For example, a simulated spatial distribution of spectral power obtained by simulating a cellular network can be compared with a measured spatial distribution of spectral power produced by the cellular network in operation. In this manner, the comparison may identify differences between the simulated operation of a wireless communication network and the actual observed operation of the wireless communication network.

At 1308, the simulated distribution is modified or updated. For instance, the simulated spatial distribution of spectral power or another parameter of wireless signals can be modified based on the comparison performed at 1306. In some implementations, based on the differences between the simulated distribution and the measured distribution, an error mesh for the geographic region can be generated. For instance, the error mesh can be generated by interpolating the differences identified for each of the locations for which a difference was identified. The interpolated difference curve 516 shown in FIG. 5B is an example of an error mesh generated by interpolating differences between a measured distribution and a simulated distribution, which may be applied over one, two or three spatial dimensions. The simulated distribution can be modified, for example, by subtracting the error mesh from the simulated distribution. For instance, the modified spatial distribution 518 shown in FIG. 5C is calculated by subtracting the interpolated difference curve 516 from the simulated spatial distribution 512. The example represented in FIG. 5C may be applied over one, two or three spatial dimensions.

In some implementations, the distribution of spectral power or another parameter of wireless signals can be updated based on updated measurements by the wireless sensor devices. For instance, each wireless sensor device may periodically provide an updated or refreshed value of the local parameter detected by the wireless sensor device, and the updated or refreshed values can be used to update the measured distribution. From the updated measured distribution, the simulated distribution can be dynamically updated, for example, in real time, at periodic intervals, or according to another time scheme. In this manner, the process 1300 or operations in the process 1300 can be iterated, to dynamically update and correct the simulated distribution based on the most recently measured parameters from the wireless sensor devices.

At 1310, the updated or modified distribution is used, for example, to analyze wireless signal propagation in the geographic region. In some cases, a modified or updated spatial distribution of spectral power is used to analyze the accuracy or quality of a signal propagation method used to simulate signal propagation. In some cases, a modified or updated spatial distribution of spectral power is used to analyze operation of a wireless communication network, such as, for example, a cellular network. For example, the modified spatial distribution of spectral power may be used to identify gaps in the coverage area that is serviced or serviceable by the wireless communication network. In some cases, the analysis can be provided to the wireless communication network as feedback, and the wireless communication network can use the analysis to improve performance of the wireless communication network or for other purposes.

Some of the operations described in this specification can be implemented as operations performed by a computer system, such as, for example, a computer system that includes one or more data processing apparatus that operates on data stored on one or more computer-readable storage devices or received from other sources. The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computing device or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computing device. Generally, a processor will receive instructions and data from a read-only memory or a random access memory or both. A computing device typically includes a processor for performing actions in accordance with instructions and one or more memory devices for storing instructions and data. Generally, a computing device will also include, or be operatively coupled to receive data from or transfer data to, or both, one or more storage devices for storing data. However, a computing device need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, subject matter described in this specification can be implemented on a computer having a display device, e.g., an LCD (liquid crystal display) screen for displaying information to the user and a keyboard and a pointing device, e.g., touch screen, stylus, mouse, etc. by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computing device can interact with a user by sending documents to and receiving documents from a device that is used by the user; for example, by sending web pages to a web browser on a user's client device in response to requests received from the web browser.

Some of the subject matter described in this specification can be implemented in a computing system that includes a back-end component, e.g., as a data server, or that includes a middleware component, e.g., an application server, or that includes a front-end component, e.g., a client computing device having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a data network.

The computing system can include clients and servers. A client and server are generally remote from each other and typically interact through a data network. The relationship of client and server arises by virtue of computer programs running on the respective computers and having a client-server relationship to each other. In some implementations, a server transmits data to a client device. Data generated at the client device can be received from the client device at the server.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable sub-combination.

A number of examples have been described. Nevertheless, it will be understood that various modifications can be made. Accordingly, other embodiments are within the scope of the following claims.

What is claimed is:

1. A spectrum analysis method comprising:
   obtaining, at computer system, a simulated spatial distribution of spectral power for a geographic region, the simulated spatial distribution based on a simulation of wireless signal propagation in the geographic region;
   obtaining, at the computer system, a measured spatial distribution of spectral power for the geographic region, the measured spatial distribution based on measurements by wireless sensor devices in the geographic region, each wireless sensor device configured to provide a local spectral power measurement based on wireless signals detected by the wireless sensor device;
   comparing, by operation of the computer system, the simulated spatial distribution with the measured spatial distribution; and
   modifying the simulated spatial distribution based on the comparison, wherein modifying the simulated spatial distribution comprises:
   identifying, for a plurality of locations in the geographic region, differences between the simulated spatial distribution and the measured spatial distribution;
   generating an error mesh for the geographic region by spatially interpolating the differences for the plurality of locations; and
   modifying the simulated spatial distribution based on the error mesh.

2. The spectrum analysis method of claim 1, wherein the simulated spatial distribution is generated by a radio propagation model.

3. The spectrum analysis method of claim 1, wherein the simulated spatial distribution is based on a simulation of wireless signal propagation produced by a wireless communication network in the geographic region.

4. The spectrum analysis method of claim 3, wherein the wireless communication network comprises a cellular network, and the method comprises comparing a simulated spatial distribution of spectral power produced by the cellular network with a measured spatial distribution of spectral power in the geographic region.

5. The spectrum analysis method of claim 3, wherein the wireless communication network comprises a cellular network, and the wireless sensor devices are configured to passively monitor cellular network signals formatted according to any of multiple distinct cellular network standards.

6. The spectrum analysis method of claim 5, wherein passively monitoring RF signals exchanged in a cellular network comprises receiving the RF signals without sending signals to or requesting services from the cellular network.

7. A spectrum analysis method comprising:
obtaining, at computer system, a simulated spatial distribution of spectral power for a geographic region, the simulated spatial distribution based on a simulation of wireless signal propagation in the geographic region;
obtaining, at the computer system, a measured spatial distribution of spectral power for the geographic region, the measured spatial distribution based on measurements by wireless sensor devices in the geographic region, each wireless sensor device configured to provide a local spectral power measurement based on wireless signals detected by the wireless sensor device;
comparing, by operation of the computer system, the simulated spatial distribution with the measured spatial distribution;
modifying the simulated spatial distribution based on the comparison;
obtaining updated measured spatial distributions of spectral power for the geographic region, the updated measured spatial distribution based on updated measurements by the wireless sensor devices; and
dynamically modifying the simulated spatial distribution based on the updated measured spatial distributions.

8. The spectrum analysis method of claim 1, comprising generating a graphical representation of the modified simulated spatial distribution.

9. The spectrum analysis method of claim 1, further comprising:
monitoring wireless-spectrum usage concurrently at a plurality of wireless-spectrum monitoring locations by operation of the wireless sensor devices;
transmitting, from each wireless sensor device, the local spectral power measurement; and
aggregating the local spectral power measurements transmitted from the wireless sensor devices.

10. A spectrum analysis system comprising:
a communication interface configured to receive local spectral power measurements for locations in a geographic region, the local spectral power measurements generated by wireless sensor devices based on wireless signals detected by the wireless sensor devices at the locations; and
data-processing apparatus configured to perform operations comprising:
obtaining a simulated spatial distribution of spectral power for a geographic region, the simulated spatial distribution based on a simulation of wireless signal propagation in the geographic region;
obtaining a measured spatial distribution of spectral power for the geographic region, the measured spatial distribution based on the local spectral power measurements generated by the wireless sensor devices;
comparing the simulated spatial distribution with the measured spatial distribution; and
modifying the simulated spatial distribution based on the comparison, wherein modifying the simulated spatial distribution comprises:
identifying, for a plurality of locations in the geographic region, differences between the simulated spatial distribution and the measured spatial distribution;
generating an error mesh for the geographic region by spatially interpolating the differences for the plurality of locations; and
modifying the simulated spatial distribution based on the error mesh.

11. The spectrum analysis system of claim 10, further comprising the wireless sensor devices.

12. The spectrum analysis system of claim 11, wherein the simulated spatial distribution is based on a simulation of wireless signal propagation produced by a cellular network in the geographic region, and the wireless sensor devices are configured to passively monitor cellular network signals formatted according to any of multiple distinct cellular network standards.

13. The spectrum analysis system of claim 11, wherein each wireless sensor device comprises:
a radio-frequency (RF) interface configured to detect RF signals in a local wireless environment about the wireless sensor device;
a signal analysis subsystem configured to process the RF signals and generate the local spectral power measurements; and
a communication interface configured to transmit the local spectral power measurements to a remote system.

14. The spectrum analysis system of claim 13, wherein each wireless sensor device comprises a dedicated housing that houses the RF interface, the signal analysis subsystem, the communication interface, and a power supply, the power supply configured to power the RF interface, the signal analysis subsystem, and the communication interface.

15. The spectrum analysis system of claim 10, wherein the simulated spatial distribution is generated by a radio propagation model.

16. A spectrum analysis system comprising:
a communication interface configured to receive local spectral power measurements for locations in a geographic region, the local spectral power measurements generated by wireless sensor devices based on wireless signals detected by the wireless sensor devices at the locations; and
data-processing apparatus configured to perform operations comprising:
obtaining a simulated spatial distribution of spectral power for a geographic region, the simulated spatial distribution based on a simulation of wireless signal propagation in the geographic region;
obtaining a measured spatial distribution of spectral power for the geographic region, the measured spatial distribution based on the local spectral power measurements generated by the wireless sensor devices;
comparing the simulated spatial distribution with the measured spatial distribution; and
modifying the simulated spatial distribution based on the comparison;
obtaining updated measured spatial distributions of spectral power for the geographic region, the updated measured spatial distribution based on updated measurements by the wireless sensor devices; and
dynamically modifying the simulated spatial distribution based on the updated measured spatial distributions.

17. The spectrum analysis system of claim 10, the operations comprising generating a graphical representation of the modified simulated spatial distribution.

18. A wireless monitoring system comprising:
means for generating local spectral power measurements for distinct locations over a geographic region based on wireless signals detected at the distinct locations; and
a computing system configured to perform operations comprising:
obtaining a simulated spatial distribution of spectral power for the geographic region, the simulated spatial distribution based on a simulation of wireless signal propagation in the geographic region;

obtaining a measured spatial distribution of spectral power for the geographic region, the measured spatial distribution based on the local spectral power measurements;

comparing the simulated spatial distribution with the measured spatial distribution; and modifying the simulated spatial distribution based on the comparison, wherein modifying the simulated spatial distribution comprises:

identifying, for a plurality of locations in the geographic region, differences between the simulated spatial distribution and the measured spatial distribution;

generating an error mesh for the geographic region by spatially interpolating the differences for the plurality of locations; and modifying the simulated spatial distribution based on the error mesh.

19. The system of claim 18, wherein the computing system comprises a communication interface configured to receive the local spectral power measurements, and a data-processing apparatus configured to compare the simulated spatial distribution with the measured spatial distribution.

20. The system of claim 18, wherein the simulated spatial distribution is generated by a radio propagation model.

* * * * *